US012671743B2

(12) United States Patent
Hu et al.

(10) Patent No.: US 12,671,743 B2
(45) Date of Patent: Jun. 30, 2026

(54) APPLICATION CONTEXT RELOCATION METHOD AND APPARATUS FOR EDGE COMPUTING SYSTEMS

(71) Applicant: HUAWEI TECHNOLOGIES CO., LTD., Shenzhen (CN)

(72) Inventors: Yajie Hu, Beijing (CN); Yanmei Yang, Beijing (CN); Cuili Ge, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/618,446

(22) Filed: Mar. 27, 2024

(65) Prior Publication Data

US 2024/0244113 A1     Jul. 18, 2024

Related U.S. Application Data

(63) Continuation of application No. PCT/CN2022/122023, filed on Sep. 28, 2022.

(30) Foreign Application Priority Data

Sep. 30, 2021    (CN) .......................... 202111166413.3

(51) Int. Cl.
| | | |
|---|---|---|
| *G06F 15/16* | (2006.01) | |
| *H04L 67/1001* | (2022.01) | |
| *H04L 67/148* | (2022.01) | |

(52) U.S. Cl.
CPC ........ *H04L 67/148* (2013.01); *H04L 67/1001* (2022.05)

(58) Field of Classification Search
CPC ... H04L 67/148; H04L 67/1001; H04L 67/63; H04L 67/141; H04L 67/146; H04L 67/289; H04L 67/34; H04L 67/51; H04W 36/322; H04W 36/0033
See application file for complete search history.

(56) References Cited

U.S. PATENT DOCUMENTS

| | | | | |
|---|---|---|---|---|
| 2014/0259109 A1* | 9/2014 | Houston | ................. | H04L 63/08 |
| | | | | 726/3 |
| 2021/0007166 A1* | 1/2021 | Liao | ...................... | H04W 48/16 |
| 2021/0058489 A1* | 2/2021 | Kim | ................. | H04W 36/0033 |
| 2021/0243264 A1* | 8/2021 | Yoon | ................... | H04L 41/5058 |
| 2022/0094764 A1* | 3/2022 | Kim | ........................ | H04L 67/63 |

(Continued)

FOREIGN PATENT DOCUMENTS

WO            2022242648 A1    11/2022

OTHER PUBLICATIONS

"Terms and abbreviations for service continuity", SAMSUNG:3GPP Draft; S6-210723, 3rd Generation Partnership Project (3GPP), Mobile Competence Centre; 650, Route Deslucioles; F-06921 Sophia-Antipolis Cedex; France vol. SA WG6, e-meeting; Mar. 1, 2021-Mar. 9, 2021 (Mar. 9, 2021), XP052174184, total 27 pages.

(Continued)

*Primary Examiner* — Razu A Miah
(74) *Attorney, Agent, or Firm* — HAUPTMAN HAM, LLP

(57) ABSTRACT

An application context relocation method includes, in response to an edge enabler server determining that a terminal device moves to a target location, sending, by the edge enabler server, an application context relocation (ACR) complete message to the terminal device for a service continuity planning ACR.

18 Claims, 10 Drawing Sheets

(56) References Cited

U.S. PATENT DOCUMENTS

| | | | |
|---|---|---|---|
| 2022/0345442 A1* | 10/2022 | Lee | H04L 67/10 |
| 2023/0291644 A1* | 9/2023 | Gautam | H04L 41/40 |
| 2024/0056906 A1* | 2/2024 | Xu | H04L 67/34 |
| 2024/0073280 A1* | 2/2024 | Fujioka | H04L 67/568 |
| 2024/0107600 A1* | 3/2024 | Luetzenkirchen | H04W 16/18 |
| 2024/0244113 A1* | 7/2024 | Hu | H04W 36/322 |

OTHER PUBLICATIONS

"EEC context relocation", 3GPP Draft; S6-212090, 3rd Generation Partnership Project (3GPP), Mobile Competence Centre; 650, Route Dessamsung: Lucioles; F-06921 Sophia-Antipolis Cedex ; FRANCE vol. SA WG6, e-meeting; Aug. 25, 2021-Sep. 31, 2021 (Sep. 1, 2021), XP052071684, total 24 pages.

Extended European Search Report issued in corresponding European Application No. 22874966.9, dated Dec. 10, 2024, pp. 1-11.

3rd Generation Partnership Project; Technical Specification Group Services and System Aspects; Architecture for enabling Edge Applications; (Release 17). 3GPP TS 23.558 V17.1.0 (Sep. 2021). total 162 pages.

International Search Report issued in corresponding International Application No. PCT/CN2022/122023, dated Dec. 9, 2022, pp. 1-10.

* cited by examiner

Method 300

Method 400

```
┌─────────────────┐        ┌─────────────────┐        ┌─────────────────────┐
│Edge enabler client│      │Edge enabler server│      │Edge application server│
│      EEC         │        │      EES        │        │        EAS          │
└─────────────────┘        └─────────────────┘        └─────────────────────┘
        │                          │                            │
```

S410. The EEC sends first indication information or second indication information to the EES, where the first indication information indicates the EES to determine mobility of a terminal device, and the second indication information indicates that the EEC does not support determining of the mobility of the terminal device S420. The EAS determines a type of an event of application context relocation ACR S430. The EAS sends, to the EES, the type of the event of the ACR and/or an AC ID corresponding to the ACR and/or a target location corresponding to the ACR S440. The EES determines whether the terminal device moves to the target location S450. The EES sends an ACR complete message to the EEC S460. The EEC receives the ACR complete message, disconnects an application client AC from a source EAS, and connects the AC to a target EAS

FIG. 4

Method 500

Method 600

Method 700

Method 800

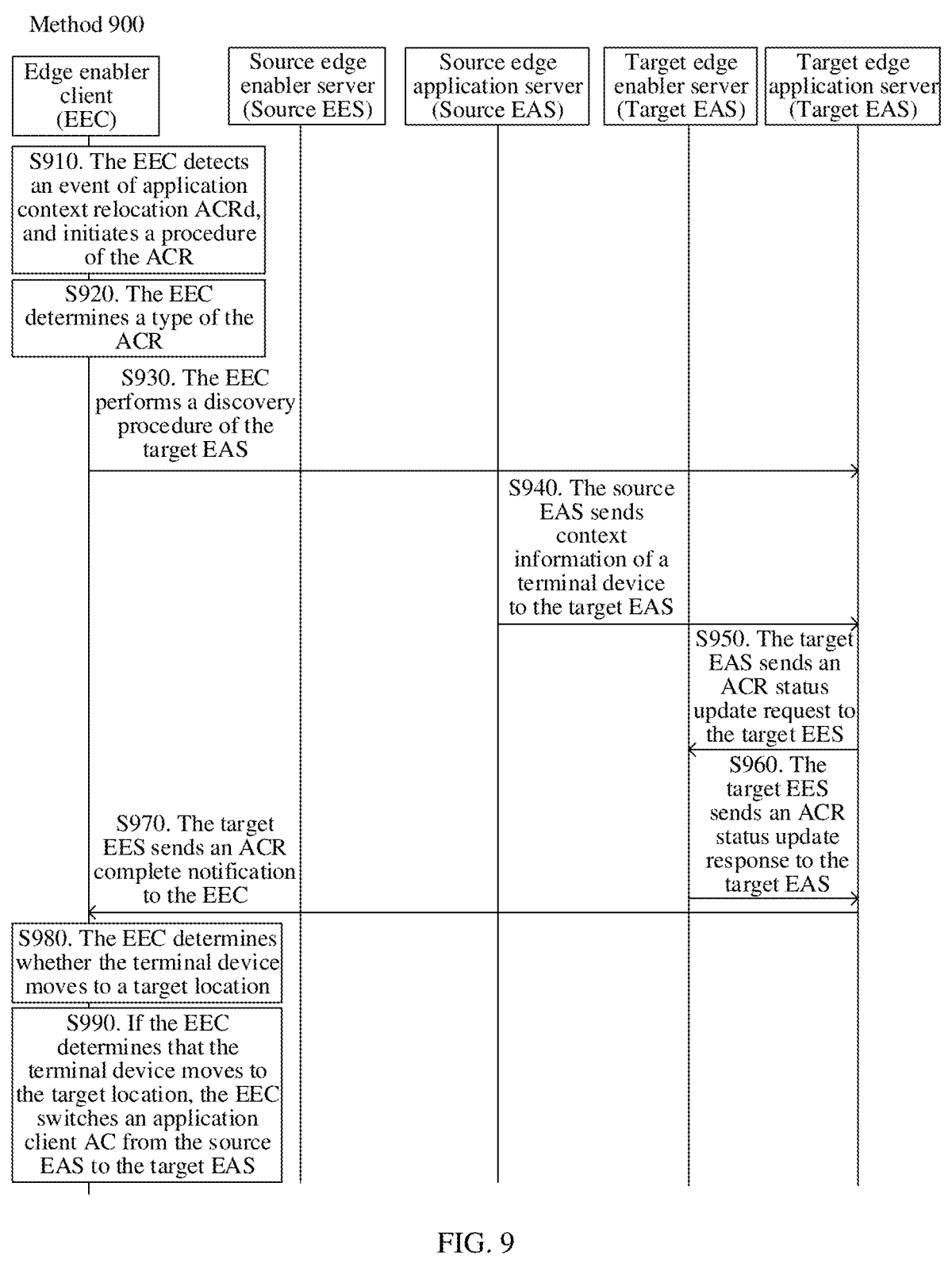

Method 900

| Edge enabler client (EEC) | Source edge enabler server (Source EES) | Source edge application server (Source EAS) | Target edge enabler server (Target EAS) | Target edge application server (Target EAS) |
|---|---|---|---|---|
| S910. The EEC detects an event of application context relocation ACRd, and initiates a procedure of the ACR | | | | |
| S920. The EEC determines a type of the ACR | | | | |
| S930. The EEC performs a discovery procedure of the target EAS | | | | |
| | | | S940. The source EAS sends context information of a terminal device to the target EAS | |
| | | | | S950. The target EAS sends an ACR status update request to the target EES |
| | | | | S960. The target EES sends an ACR status update response to the target EAS |
| S970. The target EES sends an ACR complete notification to the EEC | | | | |
| S980. The EEC determines whether the terminal device moves to a target location | | | | |
| S990. If the EEC determines that the terminal device moves to the target location, the EEC switches an application client AC from the source EAS to the target EAS | | | | |

FIG. 9

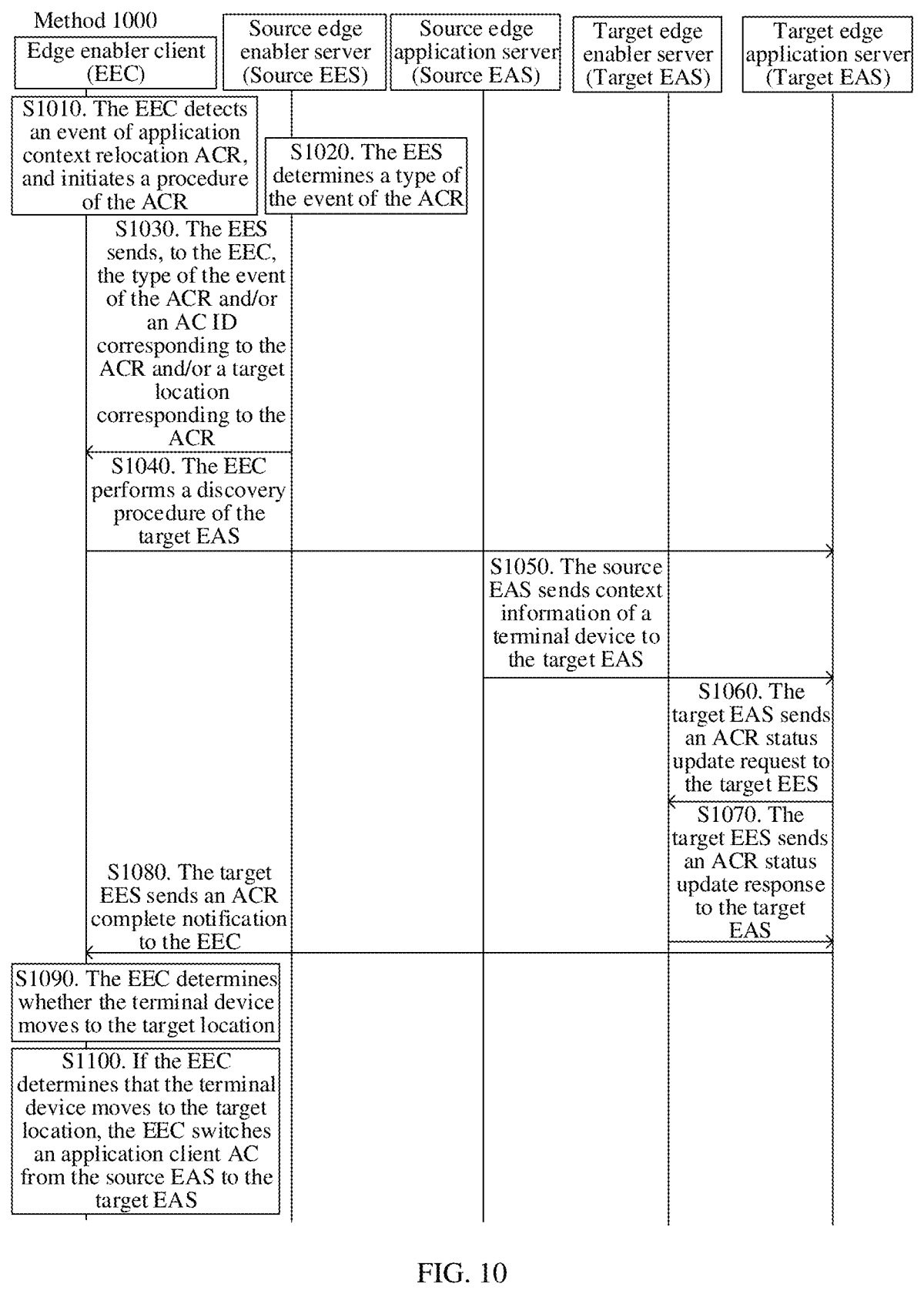

Method 1000

| Edge enabler client (EEC) | Source edge enabler server (Source EES) | Source edge application server (Source EAS) | Target edge enabler server (Target EAS) | Target edge application server (Target EAS) |
|---|---|---|---|---|

S1010. The EEC detects an event of application context relocation ACR, and initiates a procedure of the ACR S1020. The EES determines a type of the event of the ACR S1030. The EES sends, to the EEC, the type of the event of the ACR and/or an AC ID corresponding to the ACR and/or a target location corresponding to the ACR S1040. The EEC performs a discovery procedure of the target EAS S1050. The source EAS sends context information of a terminal device to the target EAS S1060. The target EAS sends an ACR status update request to the target EES S1070. The target EES sends an ACR status update response to the target EAS S1080. The target EES sends an ACR complete notification to the EEC S1090. The EEC determines whether the terminal device moves to the target location S1100. If the EEC determines that the terminal device moves to the target location, the EEC switches an application client AC from the source EAS to the target EAS

FIG. 10

Method 1100

APPLICATION CONTEXT RELOCATION METHOD AND APPARATUS FOR EDGE COMPUTING SYSTEMS

CROSS-REFERENCE TO RELATED APPLICATIONS

This application is a continuation of International Application No. PCT/CN2022/122023, filed on Sep. 28, 2022, which claims priority to Chinese Patent Application No. 202111166413.3, filed on Sep. 30, 2021. The disclosures of the aforementioned applications are hereby incorporated by reference in their entireties.

TECHNICAL FIELD

This application relates to the communication field, and more specifically, to an application context relocation method and apparatus.

BACKGROUND

In multi-access edge computing, in a running process of an edge application, when a terminal device moves out of a current service area, an edge application server that currently provides a service may fail to continue to provide a service for a currently running application client, or the edge application server that currently provides the service is no longer an optimal application server that can provide the service for the terminal device, and another edge application server may be more appropriate to provide the service for the application client on the terminal device. Therefore, a new edge application server needs to be used to replace the edge application server that currently provides the service. In this process, an application service is temporarily suspended or interrupted. Therefore, context information of the application client is transferred to the new edge application server in advance, to ensure that impact of application running interruption is minimized.

SUMMARY

This application provides an application context relocation ACR method and apparatus. The ACR method is provided, so that a terminal device is disconnected from a source edge application server and connected to a target edge application server when the terminal device moves to a target location, to avoid service interruption of the terminal device that is caused by premature switching.

According to a first aspect, an application context relocation method is provided. The method includes: For service continuity planning application context relocation ACR, if an edge enabler server determines that a terminal device moves to a target location, the edge enabler server sends an ACR complete message to the terminal device.

The target location is a service range of a target edge application server or an expected location of the terminal device.

It should be understood that the expected location of the terminal device may alternatively be referred to as a predicted location or the like. This is not limited in this application.

According to the ACR method provided in this application, when the terminal device moves to the target location, the edge enabler server sends the ACR complete message to the terminal device, and after receiving the ACR complete message, an edge application client disconnects the terminal device from a source edge application server and connects the terminal device to the target edge application server, to avoid service interruption of the terminal device that is caused by premature switching.

With reference to the first aspect, in some implementations of the first aspect, the edge enabler server receives first indication information of the terminal device, where the first indication information indicates the edge enabler server to determine mobility of the terminal device. Alternatively, the edge enabler server receives second indication information of the terminal device, where the second indication information indicates that an edge enabler client of the terminal device does not support determining of the mobility of the terminal device. This process is that the terminal device indicates the edge enabler server to determine the mobility of the terminal device; or that the terminal device and the edge enabler server perform capability negotiation. In this way, the edge enabler server can determine the mobility of the terminal device based on indication, and communication reliability is improved.

With reference to the first aspect, in some implementations of the first aspect, the edge enabler server detects an event of the ACR, where a type of the event of the ACR is the service continuity planning ACR.

Optionally, the edge enabler server stores at least one of the following: the type of the event of the ACR, an application client ID corresponding to the ACR, and the target location corresponding to the ACR.

That an edge enabler server determines that a terminal device moves to a target location includes:

The edge enabler server determines, based on the application client ID corresponding to the ACR and/or the target location corresponding to the ACR, that the terminal device moves to the target location. Optionally, the edge enabler server further determines, based on the type of the event of the ACR, that the terminal device moves to the target location.

With reference to the first aspect, in some implementations of the first aspect, the edge enabler server receives at least one of the following sent by an edge application server: a type of an event of the ACR, an application client ID corresponding to the ACR, and the target location corresponding to the ACR.

That an edge enabler server determines that a terminal device moves to a target location includes:

The edge enabler server determines, based on the application client ID corresponding to the ACR and/or the target location corresponding to the ACR, that the terminal device moves to the target location. Optionally, the edge enabler server further determines, based on the type of the event of the ACR, that the terminal device moves to the target location.

With reference to the first aspect, in some implementations of the first aspect, the edge enabler server obtains a current location of the terminal device.

That an edge enabler server determines that a terminal device moves to a target location includes:

The edge enabler server determines, based on the current location of the terminal device, the application client ID corresponding to the ACR, and the target location corresponding to the ACR, that the terminal device moves to the target location: or the edge enabler server determines, based on the current location of the terminal device and the application client ID corresponding to the ACR, that the terminal device moves to the target location.

Optionally, the edge enabler server further determines, based on the type of the event of the ACR, that the terminal device moves to the target location.

With reference to the first aspect, in some implementations of the first aspect, the edge enabler server sends a subscription message to a core network, where the subscription message is used to subscribe to the mobility of the terminal device, and the subscription message includes the application client ID (or an ID of the terminal device) corresponding to the ACR and/or the target location corresponding to the ACR. That an edge enabler server determines that a terminal device moves to a target location includes:

The edge enabler server receives a notification message sent by the core network, where the notification message indicates the terminal device to move to the target location.

It should be noted that before the edge enabler server sends the ACR complete message to the terminal device, it should be determined that application context transmission ACT is completed, where ACT completion indicates that application context is transmitted from the source edge application server to the target edge application server.

According to a second aspect, in correspondence to some implementations of the first aspect, when an edge application server detects an event of ACR, a type of the event of the ACR is service continuity planning ACR. The edge application server sends, to an edge enabler server, at least one of the following: the type of the event of the ACR, an application client ID corresponding to the ACR, and a target location corresponding to the ACR.

According to a third aspect, in correspondence to some implementations of the first aspect, a terminal device sends first indication information or second indication information to an edge enabler server, where the first indication information indicates the edge enabler server to determine mobility of the terminal device. Alternatively, the terminal device sends second indication information to the edge enabler server, where the second indication information indicates that an edge enabler client of the terminal device does not support determining of the mobility of the terminal device. This process is that the terminal device indicates the edge enabler server to determine the mobility of the terminal device: or that the terminal device and the edge enabler server perform capability negotiation. In this way, the edge enabler server can determine the mobility of the terminal device based on indication, and communication reliability is improved.

According to a fourth aspect, an application context relocation method is provided. The method includes: An edge enabler client receives an application context relocation ACR complete message sent by an edge enabler server. For service continuity planning ACR, if the edge enabler client determines that a terminal device moves to a target location, an application client is switched from a source edge application server to a target edge application server.

The target location is a service range of the target edge application server or an expected location of the terminal device.

It should be understood that the expected location of the terminal device may alternatively be referred to as a predicted location or the like. This is not limited in this application.

According to the method provided in this application, when the edge enabler client determines that the terminal device moves to the target location, the terminal device is disconnected from the source edge application server, and is connected to the target edge application server, to avoid service interruption of the terminal device that is caused by premature switching.

With reference to the fourth aspect, in some implementations of the fourth aspect, the edge enabler client detects an event of the ACR, where a type of the event of the ACR is the service continuity planning ACR.

Optionally, the edge enabler client stores at least one of the following: the type of the event of the ACR, an application client ID corresponding to the event of the ACR, and the target location corresponding to the event of the ACR.

That the edge enabler client determines that a terminal device moves to a target location includes:

The edge enabler client determines, based on the application client ID corresponding to the ACR and/or the target location corresponding to the ACR, that the terminal device moves to the target location. Optionally, the edge enabler client further determines, based on the type of the event of the ACR, that the terminal device moves to the target location.

It should be noted that before the edge enabler client switches the application client from the source edge application server to the target edge application server, it should be determined that application context transmission ACT is completed.

With reference to the fourth aspect, in some implementations of the fourth aspect, the edge enabler client receives, from the edge enabler server, at least one of the following: a type of an event of the ACR, an application client ID corresponding to the ACR, and the target location corresponding to the ACR.

That the edge enabler client determines that a terminal device moves to a target location includes:

determining, based on the application client ID corresponding to the ACR and/or the target location corresponding to the ACR, that the terminal device moves to the target location. Optionally, the edge enabler client further determines, based on the type of the event of the ACR, that the terminal device moves to the target location.

It should be noted that, before the edge enabler client switches the application client from the source edge application to the target edge application, it should be determined that application context transmission ACT is completed, where ACT completion indicates that application context is transmitted from the source edge application server to the target edge application server.

According to a fifth aspect, in correspondence to the fourth aspect, when an edge enabler server detects an event of ACR, a type of the event of the ACR is service continuity planning ACR.

The edge enabler server sends, to an edge enabler client, at least one of the following: the type of the event of the ACR, an application client ID corresponding to the ACR, and a target location corresponding to the ACR.

According to a sixth aspect, an application context relocation method is provided. The method includes: For service continuity planning application context relocation ACR, an edge application server sends, to an edge enabler server, an application client ID corresponding to the ACR and/or a target location corresponding to the ACR. The edge application server receives a first notification message of the edge enabler server, where the first notification message indicates a terminal device to move to the target location. The edge application server sends indication information to the edge enabler server based on the first notification message, where the indication information indicates that application context transmission ACT is completed.

According to the method provided in this application, the edge application server sends, to the edge enabler server, the application client ID corresponding to the ACR and/or the target location corresponding to the ACR, so that the edge enabler server sends the indication information to the edge application server after determining, based on the information, that the terminal device moves to the target location. This avoids signaling waste caused by frequently sending location information of the terminal device to the edge application server, and reduces signaling overheads.

With reference to the sixth aspect, in some implementations of the sixth aspect, the edge application server sends a subscription message to the edge enabler server, where the subscription message indicates the edge enabler server to send the first notification message to the edge application server when the terminal device moves to the target location.

With reference to the sixth aspect, in some implementations of the sixth aspect, the edge application server detects an event of the ACR, where a type of the event of the ACR is the service continuity planning ACR.

According to a seventh aspect, in correspondence to the sixth aspect, an edge enabler server receives an application client ID corresponding to ACR and/or a target location corresponding to the ACR that are/is sent by an edge application client.

The edge enabler server sends a first notification message to an edge application server, where the first notification message indicates a terminal device to move to the target location.

With reference to the seventh aspect, in some implementations of the seventh aspect, the edge enabler server receives a subscription message sent by an edge enabler client, where the subscription message indicates the edge enabler server to send the first notification message to the edge application server when the terminal device moves to the target location.

According to an eighth aspect, an apparatus is provided, including a unit configured to perform the steps in the communication method according to any one of the first aspect to the seventh aspect or the implementations of the first aspect to the seventh aspect.

In a design, the communication apparatus is a communication chip. The communication chip may include an input circuit or an interface used to send information or data, and an output circuit or an interface used to receive information or data.

In another design, the communication apparatus is a communication device (for example, an edge enabler server). The communication chip may include a transmitter configured to send information or data, and a receiver configured to receive information or data.

According to the eighth aspect, the communication device is provided, including a processor and a memory. The memory is configured to store a computer program. The processor is configured to invoke the computer program from the memory and run the computer program, so that the communication device performs the communication method according to any one of the first aspect to the seventh aspect or the implementations of the first aspect to the seventh aspect.

Optionally, there are one or more processors, and there are one or more memories.

Optionally, the memory may be integrated with the processor, or the memory and the processor are separately disposed.

Optionally, the communication device further includes the transmitter (a transmitting device) and the receiver (a receiving device).

According to a ninth aspect, a computer program product is provided. The computer program product includes a computer program (which may alternatively be referred to as code or instructions). When the computer program is run, a computer is enabled to perform the communication method according to any one of the first aspect to the seventh aspect or the implementations of the first aspect to the seventh aspect.

According to a tenth aspect, a communication system is provided. The system includes at least one apparatus configured to perform the method in the first aspect and the implementations of the first aspect.

Optionally, the communication system further includes at least one apparatus configured to perform the method in the second aspect and the implementations of the second aspect.

Optionally, the communication system further includes at least one apparatus configured to perform the method in the third aspect and the implementations of the third aspect.

According to an eleventh aspect, a communication system is provided. The system includes at least one apparatus configured to perform the method in the fourth aspect and the implementations of the fourth aspect.

Optionally, the communication system further includes at least one apparatus configured to perform the method in the fifth aspect and the implementations of the fifth aspect.

According to a twelfth aspect, a communication system is provided. The system includes at least one apparatus configured to perform the method in the sixth aspect and the implementations of the sixth aspect.

Optionally, the communication system further includes at least one apparatus configured to perform the method in the seventh aspect and the implementations of the seventh aspect.

According to a thirteenth aspect, a chip system is provided, including a memory and a processor. The memory is configured to store a computer program, and the processor is configured to invoke the computer program from the memory and run the computer program, so that a communication device on which the chip system is installed performs the communication method according to any one of the foregoing aspects or the implementations of the foregoing aspects.

The chip system may include an input circuit or interface used to send information or data, and an output circuit or interface used to receive information or data.

BRIEF DESCRIPTION OF DRAWINGS

FIG. 4 is a schematic diagram of another example of an application context relocation method according to an embodiment of this application:

FIG. 9 is a schematic diagram of a still further example of an application context relocation method according to an embodiment of this application:

FIG. 10 is a schematic diagram of a yet further example of an application context relocation method according to an embodiment of this application:

DESCRIPTION OF EMBODIMENTS

Figure 1:
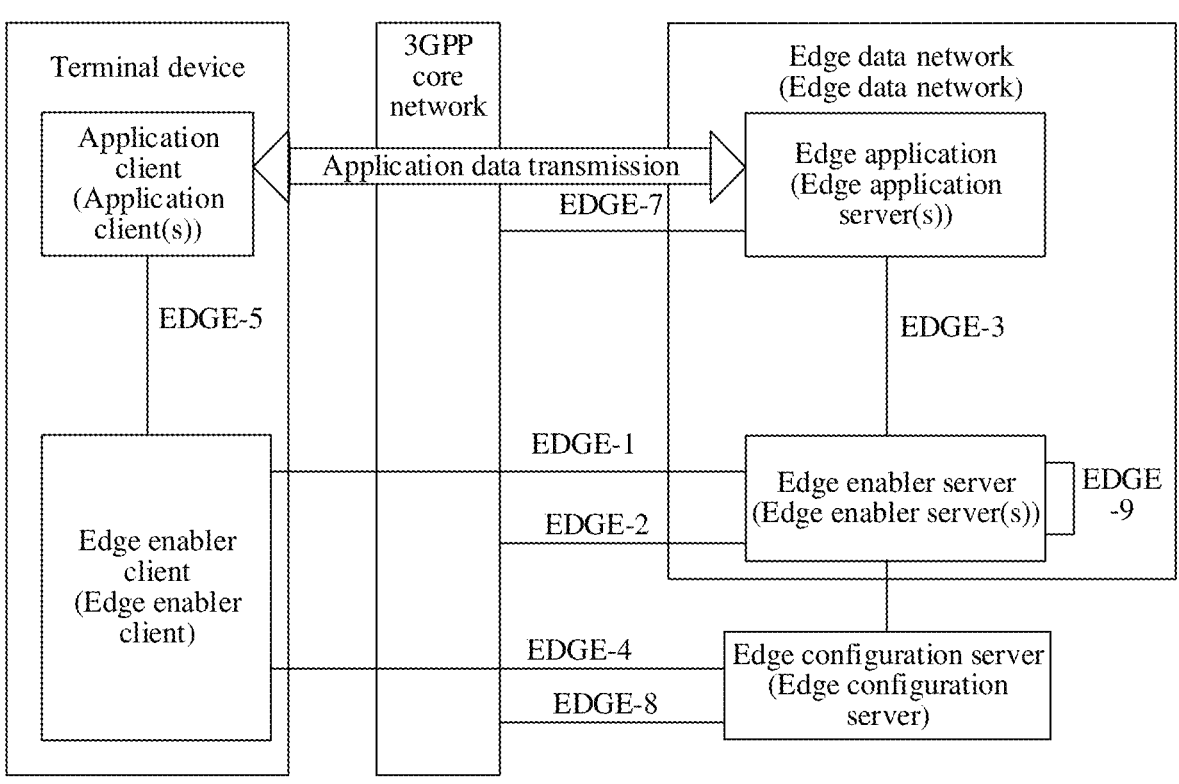
FIG. 1 is a schematic diagram of a system architecture according to an embodiment of this application.

The following describes technical solutions of this application with reference to the accompanying drawings.

The technical solution of embodiments of this application may be used in various communication systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, and a 5th generation (5G) system or a new radio (NR) system.

A terminal device in embodiments of this application may alternatively be referred to as user equipment, an access terminal, a subscriber unit, a subscriber station, a mobile station, a remote station, a remote terminal, a mobile device, a user terminal, a terminal, a radio communication device, a user agent, a user apparatus, or the like. The terminal device may be a cellular phone, a cordless phone, a session initiation protocol (SIP) phone, a wireless local loop (WLL) station, a personal digital assistant (PDA), a handheld device having a radio communication function, a computing device, another processing device connected to a wireless modem, a vehicle-mounted device, a wearable device, a terminal device in a 5G network, a terminal device in an evolved public land mobile network (PLMN), or the like. This is not limited in embodiments of this application.

A network device in embodiments of this application may be a device configured to communicate with the terminal device. The network device may be a base station ( ) in the global system for mobile communications (GSM) or the code division multiple access (CodeCDMA) system, a base station (NB) in the wideband code division multiple access (WCDMA) system, an evolved base station (Evolved NodeB, eNB or eNodeB) in the LTE system, or a radio controller in a cloud radio access network (CRAN) scenario. Alternatively, the network device may be a relay station, an access point, a vehicle-mounted device, a wearable device, a network device in a 5G network, a network device in an evolved PLMN network, or the like. This is not limited in embodiments of this application.

The following briefly describes related technical terms in embodiments of this application.

1. Multi-Access Edge Computing (MEC)

In the MEC, a radio access network is used to provide a needed IT service and cloud computing function for a telecommunication user nearby, to create a carrier-class service environment with high performance, low latency, and high bandwidth. This accelerates fast downloading of content, services, and applications in a network and allows a consumer to have uninterrupted high-quality network experience.

2. Data Network (DN)

The data network is a service network of an operator or a third party, and may provide a service for the terminal device, for example, an operator service or an internet service.

3. Local Data Network (Local DN)

The local data network is a data network access point (access point) that is close to a user attachment point.

4. Application Context

The application context is running status information related to one user or a group of users, and optionally, may further include context of subscription of the one or more users to a source application instance or an edge application EAS and a core network, for example, a transaction identifier of the subscription. Optionally, context of the one or more users on an edge enabler server EES may be further included, for example, a transaction identifier of subscription of a source EAS to the one or more users.

5. Application Context Relocation (ACR)

In a running process of an edge application, when the terminal device moves out of a current service area, for example, a terminal device between edge data networks (EDNs) moves, or a terminal device between local area data networks (LADNs) moves, an edge application server EAS that currently provides a service may fail to continue to provide the service for a currently running application, or the edge application server EAS that currently provides the service is no longer an optimal application server that can provide the service for the terminal device, another EAS may be more appropriate to serve the application client on the terminal device, and a new edge application server EAS is selected to provide a service for the terminal device. Therefore, the new EAS needs to be used to replace the EAS that currently provides the service. In this process, an application service is temporarily suspended or interrupted, and application context needs to be transferred to the new EAS, to ensure that impact of application running interruption is minimized.

FIG. 1 is a schematic diagram of a system architecture according to an embodiment of this application. The following briefly describes functional entities and interfaces involved in FIG. 1.

1. Edge Data Network (EDN)

In a possible implementation, the EDN corresponds to one data network, is a special local data network (local DN), may include an edge enabler function, may be identified by a DNAI and a DNN, and is a network logical concept. In another possible implementation, the EDN is an equivalent concept of a center cloud, may be understood as a local data center (a geographical location concept), may be identified by the DNAI, and may include a plurality of local data networks.

2. Application Instance/Edge Application Server (EAS)

An edge application is an application deployed on the edge data network. The edge application refers to an instance that is of a server application program (for example, social media software, augmented reality (augmented reality, AR), or virtual reality (VR)) and that is deployed and runs on the EDN. One or more EASs may be deployed by an application on one or more EDNs. The EASs deployed on different EDNs may be considered as different EASs of the application, may share a domain name, and may use an IP address, or may use different IP addresses. The EAS may alternatively be referred to as an edge application server, an application instance, an edge application instance, an MEC application server, an EAS function, or the like.

3. Application Client (AC)

The application client is a peer entity of the edge application on a terminal device side. The application client is used by an application user to obtain an application service from the edge application EAS. The application client is a client program of an application on the terminal device side. The application client may be connected to an application server on a cloud to obtain the application service, or may be connected to the edge application EAS deployed and running on the one or more EDNs to obtain the application service.

4. Edge Enabler Server (EES)

The edge enabler server EES may provide some enabler capabilities for the edge application EAS deployed on the EDN, to better support deployment of the edge application in the MEC. The EES may support registration of the edge application EAS and authentication and authorization of a terminal device, and provides IP address information and the like of the EAS for the terminal device. The EES may further support obtaining of an identifier and the IP address information of the EAS, and further send the identifier and the IP address information of the EAS to the edge data network EDN. The EES is deployed on the EDN. Generally, the EAS is registered to one EES, or information about the EAS is configured on the one EES by using a management system. The EES is referred to as the EES associated with the EAS. The EES controls/manages the EAS registered with/configured on the EES.

5. Edge Enabler Client (EEC)

The EEC is a peer entity of the EES on the terminal device side. The EEC is configured to: register information about the EEC and information about the application client to the EES, perform security authentication and authorization, obtain an IP address of the EAS from the EES, and provide an edge computing enabler capability for the application client, for example, an EAS discovery service, returning of the IP address of the EAS to the application client.

It should be noted that in this embodiment of this application, the terminal device may include one or more EECs. It should be understood that, in this embodiment of this application, the EEC and the terminal device may be replaced with each other in some cases.

6. Edge Configuration Server (ECS)

The ECS is responsible for EDN configuration, for example, provide information about the EES for the terminal device, may further directly provide information about the EAS for the terminal device, may interact with a DNS of an application to obtain the information about the EAS, and further obtain and save the information about the EAS and the IP address information from another functional entity.

It should be noted that the application user signs a service agreement with an application provider, to provide a service for the application user. The application user logs in to the application client on the terminal device and communicates with the EAS via the application client. The edge enabler client is a middle layer, and is commonly located in an operating system, or is located between the application client and the operating system. The application client may obtain an edge enabler service from the edge enabler client through an application programming interface (API).

Figure 2:
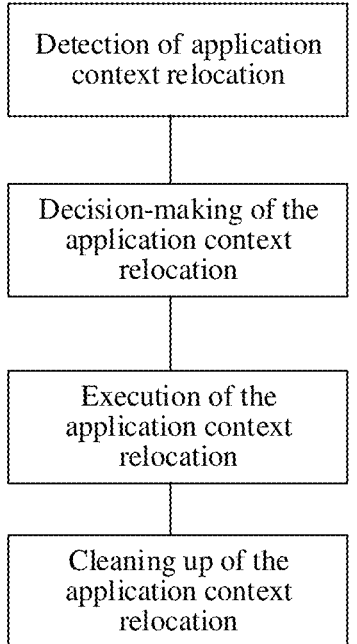
FIG. 2 is a schematic diagram of a procedure of application context relocation according to an embodiment of this application.

FIG. 2 is a schematic diagram of a procedure of application context relocation ACR according to an embodiment of this application.

ACR is mainly divided into four phases.

Phase 1: Detection of the ACR

The detection of the ACR is to determine that context transfer may need to be performed. In this case, some events, for example, a location change of a terminal device or an update of a user plane path of the terminal device, are mostly detected by a detection entity.

Phase 2: Decision-Making of the ACR

A decision-making entity determines that the ACR needs to be performed.

Phase 3: Execution of the ACR

It is mainly about transferring context information of an AC from a source EAS to a predicted EAS or an EAS to which the terminal device has moved. In this step, information for notifying the terminal device of the predicted EAS may be further sent to the terminal device, and context transfer completion and related information about the predicted EAS, for example, an address of the predicted EAS and routing information corresponding to the predicted EAS, may be further sent to a network device.

It should be noted that, before the context transfer is performed, a target EES needs to be discovered. The process always follows a two-level discovery mechanism, in other words, an EES platform is discovered first, and then the EAS is discovered from the EES platform.

By way of example and not limitation, when a location of the terminal device changes, the detection entity of the ACR predicts that the EAS of the terminal device is to change, and may send context information of the terminal device from the source EAS to a predicted target EAS in advance. A type of the ACR in which the context information is transferred to the target EAS in advance corresponds to service continuity planning ACR. The context information of the terminal device may be transferred from the source EAS to the target EAS in advance based on prediction. This avoids service interruption caused because the context transfer is performed after the terminal device moves to the target EAS.

By way of example and not limitation, when the user plane path of the terminal device changes, the terminal device has been disconnected from the source EAS and is connected to the target EAS. The detection entity of the ACR determines that the EAS of the terminal device has changed, and sends context information from the source EAS to the target EAS. Because the context transfer is performed after the terminal device is switched, the service interruption is caused. The type of the ACR may correspond to common ACR.

Phase 4: Cleaning Up after the ACR

This step relates to a plurality of entities. This step may be: for example, an application client initiates a new socket connection to the target EAS.

The following describes discovery procedures of the EES platform and the EAS.

Step 1: an EEC of the Terminal Device Discovers the EES Platform from an ECS.

1. The EEC requests or subscribes to, from the ECS, the EES platform corresponding to the location of the terminal device. The EEC discovers, from the ECS, an EES enabler platform or an EDN that the EEC is interested in.

2. An ECS platform provides detailed information about the EAS, obtains a data network access identifier (DNAI) based on the location of the terminal device, and selects an appropriate EES for each AC with reference to the DNAI, a fully qualified domain name (FQDN), and an EES configuration file filter. The EES platform is selected with reference to the location of the terminal device.

3. Obtain a current or potential DNAI.

4. The EEC obtains information about one or more EESs from the ECS.

Step 2: The EEC Discovers the EAS from the EES Platform.

1. The EEC sends an EAS discovery request message to the EES, where the EAS discovery request message includes an EEC ID and a security credential, and may include an EAS discovery filter to retrieve information about a specific EAS or a specific type of an EAS (for example, a game application program).

2. The EES matches registered AC information. The EES matches, based on information about an EAS that is registered or gets online locally and a discovery filtering parameter provided by a user, an EAS that meets a request of the user. If a plurality of EASs meet the request, the plurality of EASs may be returned.

3. The EES returns the information about the EAS to the EEC. Further, the EEC may provide the information for the AC, for the AC to connect to the EAS.

It should be noted that the detection, decision-making, execution, and cleaning up of the ACR may be completed by different functional entities. The following describes, by using examples, a specific process of executing the ACR by the different functional entities. It should be noted that, when a type of an event of the ACR corresponds to the service continuity planning ACR, because the target EES and the target EAS have not been discovered, the detection of the ACR is performed by the EEC, a source EES, or the source EAS.

Solution 1: The EEC Initiates the ACR, and Uses Common EAS Discovery.

Detection of the ACR: The EEC determines that the context transfer may need to be performed. For example, the EEC detects a change of the location of the terminal device, or the like.

Decision-making of the ACR: The EEC determines that the ACR needs to be performed.

Execution of the ACR: The EEC discovers the target EES and the target EAS. The EEC requests the source EES to initiate user plane path modification. The EEC and the AC initiate application context transfer.

Cleaning up of the ACR.

Solution 2: The EEC Performs the ACR by Using the Source EES.

Detection of the ACR: The EEC determines that the context transfer may need to be performed. For example, the EEC detects the change of the location of the terminal device, or the like.

Decision-making of the ACR: The EEC determines that the ACR needs to be performed.

Execution of the ACR: The EEC discovers the target EES and the target EAS. The EEC requests the source EES to initiate the user plane path modification. The source EES notifies the source EAS to initiate the application context transfer.

Cleaning up of the ACR.

Solution 3: The EEC Performs the ACR by Using the Target EES.

Detection of the ACR: The EEC determines that the context transfer may need to be performed. For example, the EEC detects the change of the location of the terminal device, or the like.

Decision-making of the ACR: The EEC determines that the ACR needs to be performed.

Execution of the ACR: The EEC discovers the target EES and the target EAS. The EEC requests the target EES to initiate the user plane path modification. The target EES notifies the target EAS to initiate the application context transfer.

Cleaning up of the ACR.

Solution 4: The Source EAS Initiates the ACR Procedure.

Detection of the ACR: The source EES detects and notifies the source EAS that there is a need of the ACR, or the source EAS detects the need of the ACR, or an expected or predicted location of the terminal device is used to trigger service continuity planning.

Decision-making of the ACR: The source EAS determines that the ACR needs to be performed.

Execution of the ACR: The source EAS discovers the target EES and the target EAS, or the source EAS performs a discovery procedure of the target EAS by using the expected or predicted location of the terminal device, to discover the target EES and the target EAS at the predicted location of the terminal, initiate the user plane path modification, and perform application context transmission.

Cleaning up of the ACR.

Solution 5: The Source EES Performs the ACR.

Detection of the ACR: The source EES, the source EAS, and a source EEC may all determine that the context transfer may need to be performed.

Decision-making of the ACR: The detection entity notifies the source EES, and the source EES determines to perform the application context transfer.

Execution of the ACR: The source EES discovers the target EES and the target EAS. The source EES initiates the user plane path modification. The source EES notifies the source EAS to initiate the application context transfer.

Cleaning up of the ACR.

Solution 6: Automatic ACR

Detection of the ACR: Source EES

Decision-making of the ACR: The source EES determines to perform the application context transfer.

Execution of the ACR: The source EES discovers the target EES and the target EAS. The source EES initiates the user plane path modification. The source EES initiates the application context transfer.

Cleaning up of the ACR.

Figure 3:
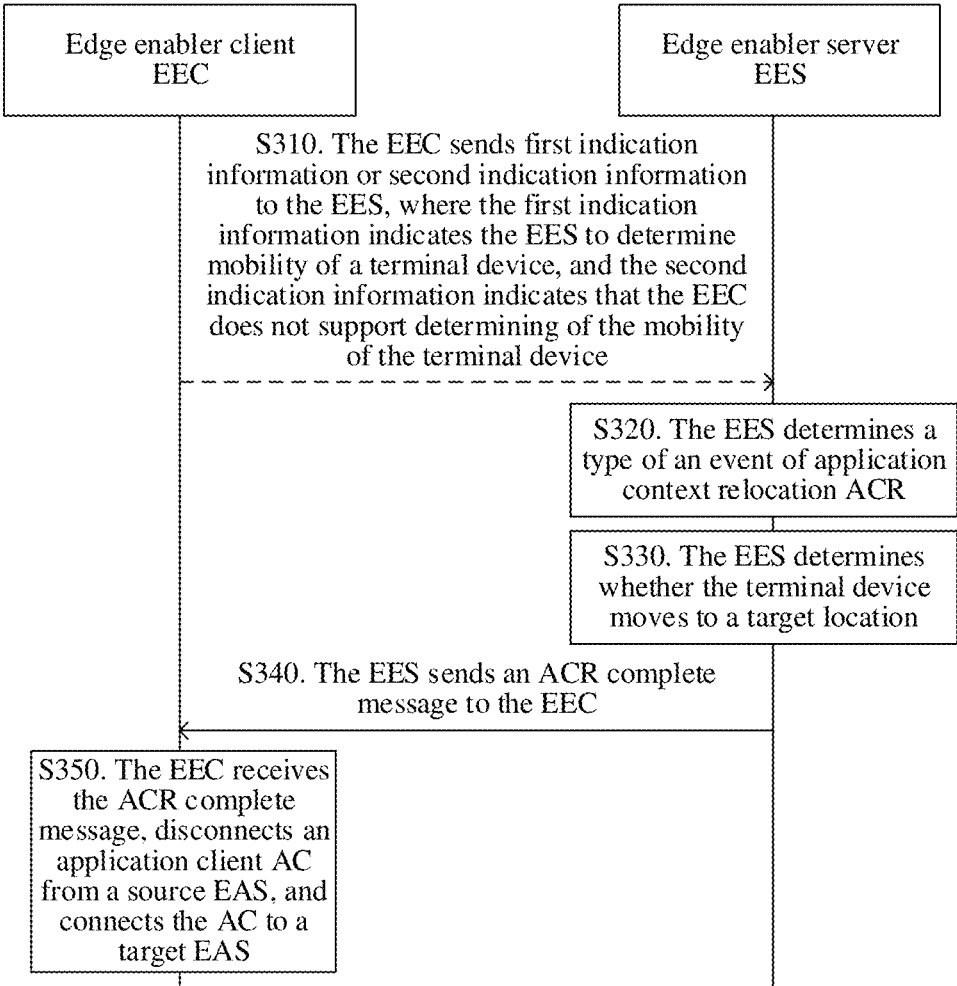
FIG. 3 is a schematic diagram of an example of an application context relocation method according to an embodiment of this application.

FIG. 3 shows an example of an application context relocation method according to an embodiment of this application. In the method shown in FIG. 3, an EES determines a type of ACR, and the EES determines mobility of a terminal device. The method 300 includes the following steps.

S310. An EEC sends first indication information or second indication information to the EES, where the first indication information indicates the EES to determine the mobility of the terminal device, and the second indication information indicates that the EEC does not support determining of the mobility of the terminal device.

The first indication information indicates the EES to determine the mobility of the terminal device. It should be understood that determining the mobility of the terminal device may be determining whether the terminal device is located at a target location.

The target location may be a service range of a target EAS or an expected location of the terminal device.

It should be understood that the service range of the target EAS may be a range covered by a data network corresponding to a DNAI corresponding to the target EAS, a geographical location range corresponding to the target EAS, or the like.

It should be understood that the expected location of the terminal device may be the DNAI corresponding to the target EAS to which the terminal device is to access, an expected geographic location of the terminal device, a cell to which the terminal device is expected to access, an expected tracking area (TA) of the terminal device, or the like.

It should be noted that a name of the expected location of the terminal device may alternatively be a predicted location of the terminal device, a location to which the terminal device is to move, or the like. The name is not particularly limited in this embodiment of this application.

It should be understood that the first indication information may be an information element that indicates the EES to determine the mobility of the terminal device. Optionally, the first indication information may further include an information element that indicates the EES to determine a sending occasion of an ACR complete message. Optionally, the sending occasion of the ACR complete message may be that application context transmission ACT is completed, and that the terminal device moves to the target location. ACT completion indicates that sending of application context information from a source EAS to the target EAS is completed. It may be considered that an indication manner including a specific information element is explicit.

It should be understood that the first indication information may further be indication information that indicates the EES to detect an event of the ACR, indication information that indicates the EES to trigger a procedure of the ACR, and/or indication information that indicates the EES to perform the procedure of the ACR. In other words, the indication information that indicates the EES to detect the event of the ACR, the indication information that indicates the EES to trigger the procedure of the ACR, and/or the indication information that indicates the EES to perform the procedure of the ACR further indicates the EES to determine the mobility of the terminal device. It may be considered that the foregoing indication manner is implicit. If the EES receives the first indication information, the EES determines that the EES performs a procedure of detecting the ACR and/or triggers the procedure of the ACR, and the EES determines the mobility of the terminal device. Optionally, the EES further determines the sending occasion of the ACR complete message. Optionally, the sending occasion may be the same as that described in the foregoing paragraph, and details are not described herein again.

It should be understood that the EEC indicates, by using the first indication information, the EES to determine the mobility of the terminal device, and the EEC may support the determining of the mobility of the terminal device but does not determine the mobility of the terminal device, or the EEC may not support the determining of the mobility of the terminal device.

It should be noted that, before the ACR starts or in the process of the ACR, the EES may perform capability negotiation with the EEC. For example, the EES may send a piece of signaling to the EEC, where the signaling indicates that the EES supports the determining of the mobility of the terminal device. The EEC determines that the EES determines the mobility of the terminal device. Alternatively, the EES may not need to send the signaling, and the EEC tacitly approves that the EES supports the determining of the mobility of the terminal device.

It should be noted that the EEC may alternatively not send the first indication information to the EES. In other words, the EEC may tacitly approve that the EES determines the mobility of the terminal device. Optionally, when the EEC and the EES select an ACR method, it is determined or configured that a detection entity of the mobility of the terminal device is the EES. In other words, it has been determined or configured, in an ACR configuration phase, that the detection entity of the mobility of the terminal device is the EES. Therefore, in entities such as the EES, the EEC, and the EAS, according to a determined or configured solution, the EES is determined to detect the mobility of the terminal device. Optionally, it is tacitly approved that the EES determines the sending occasion of the ACR complete message.

The second indication information indicates that the EEC does not support the determining of the mobility of the terminal device. It should be understood that, that the EEC does not support the determining of the mobility of the terminal device may be that the EEC does not support obtaining of a location of the terminal device, and/or that the EEC does not support determining of the type of the ACR, and/or that the EEC does not support determining of whether the location of the terminal device is located at the target location.

It should be understood that, after receiving the second indication information, the EES determines that a capability of the EEC does not support the determining of the mobility of the terminal device, and thus determines that the EES determines the mobility of the terminal device. Optionally, the EES determines the sending occasion of the ACR complete message.

It should be noted that the second indication information carries capability information of the EEC, in other words, carries an information element indicating that the EEC does not support the determining of the mobility of the terminal device. It may be considered that the indication manner is explicit.

It should be noted that, the second indication information may alternatively be indication information that indicates that the EEC does not support detection of the event of the ACR, or indication information that indicates that the EEC does not support triggering of the procedure of the ACR. In other words, information that indicates that the EEC does not support the detection of the event of the ACR, or information that indicates that the EEC does not support the triggering of the procedure of the ACR further indicates that the EEC does not support the determining of the mobility of the terminal device. It may be considered that the indication manner is implicit. If the EES receives the second indication information, the EES determines that the EES performs the procedure of detecting the ACR or triggers the procedure of the ACR, and that the EES determines the mobility of the terminal device. Optionally, the EES further determines the sending occasion of the ACR complete message. Optionally, the sending occasion may be the same as the foregoing.

It should be noted that the EEC may alternatively not send the second indication information to the EES. The EES determines, based on local configuration information, by requesting for the capability of the EEC from another network element, or the like, that the EEC does not support the determining of the mobility of the terminal device, and that the EES determines the mobility of the terminal device.

The first indication information or the second indication information may be included in an existing request message, for example, an ACR information subscription request message. The first indication information or the second indication information may alternatively be sent by using a newly added piece of signaling, for example, an ACR mobility capability message. This is not limited in this embodiment of this application.

It should be noted that, when determining the mobility of the terminal device, the EES first needs to obtain and determine the target location of the terminal device.

The EES may obtain the target location of the terminal device by using a capability of a 3GPP core network.

For example, the EES may obtain the target location of the terminal device by subscribing to a UPPM (user plane path management) event notification from the 3GPP core network.

For another example, the EES may alternatively obtain the target location of the terminal device through an API (application programming interface) opened to the 3GPP core network, for example, an SCEF (service capability exposure function) API/an NEF (network exposure function, network exposure function) API/the SCEF (service capability exposure function) API+the NEF (network exposure function) API or an LCS (location service) API.

For still another example, the EES may further analyze an expected behavior of the terminal device based on an NEF (network exposure function) or an NWDAF (network data analytics function) opened by the 3GPP core network, and obtain the target location of the terminal device.

The EES may obtain the target location of the terminal device by obtaining related information from an AC by using the EEC. The related information includes at least one of the following: an AC plan/schedule, an expected AC geographic service area, an expected service KPI, and a preferred ECSP (edge computing service provider) list.

It should be noted that the EEC may obtain the foregoing related information through an EDGE-5 interface in the system architecture described in FIG. 1, or may obtain the foregoing related information through another path. This is not limited in this embodiment of this application.

It should be noted that, as described above, step S310 is optional. Alternatively, it is tacitly approved that the EES determines the mobility of the terminal device, or it is predefined, in a configuration phase, that the EES determines the mobility of the terminal device, and the first indication information or the second indication information is not sent.

S320. The EES determines a type of the event of the ACR.

It should be understood that, when the EES detects the event of the ACR, the EES further determines the type of the event of the ACR.

It should be noted that the event of the ACR may be, for example, that the EAS is overloaded, that the terminal device moves, that it is predicted that the terminal device is about to move, or that the source EAS cannot provide a service.

The type of the event of the ACR may include common ACR and service continuity planning ACR. It should be understood that the type of the event of the ACR in this application may alternatively be referred to as the type of the ACR. Therefore, the type of the event of the ACR in the following may be directly replaced with the type of the ACR.

The common ACR is ACR in which whether the terminal device arrives at the target location does not need to be determined, or in other words, a sending occasion of an ACR complete message in the common ACR may be that the ACT is completed. After receiving the ACR complete message, the EEC may switch the AC from the source EAS to the target EAS.

By way of example and not limitation for the common ACR, the terminal device has moved to a service range of another EAS, and a detection entity, for example, the EES, detects the event of the ACR, in other words, the terminal device moves to the service range of another EAS. Further, the EES initiates the procedure of the ACR, and sends corresponding context information to the target EAS (which may be an EAS to which the terminal device has moved). After the ACT is completed and the EEC receives an ACR complete notification, the AC is switched from the source EAS to the target EAS, and the determining of the mobility of the terminal device is not needed.

The service continuity planning ACR may alternatively be referred to as prediction ACR or the like. The service continuity planning ACR may be ACR in which context information is transmitted to the target EAS in advance because it is predicted that an EAS subsequently serving the AC may change. This is not particularly limited in this application. For example, the service continuity planning ACR is ACR that is performed when it is predicted that the terminal is about to arrive at the target location and the terminal device has not arrived at the target location. In the service continuity planning ACR, the mobility of the terminal device needs to be determined. In other words, after it is determined that the terminal device arrives at the target location, the AC is switched from the source EAS to the target EAS. Alternatively, after receiving the ACR complete message, the EEC switches the AC from the source EAS to the target EAS. It should be noted that, the sending occasion of the ACR complete message is that the ACT is completed and that the terminal device moves to the target location.

By way of example and not limitation for the service continuity planning ACR, the detection entity detects that the location of the terminal device may change, initiates the procedure of the ACR, determines the target EAS, transmits the context information to the target EAS in advance, and determines the target location of the terminal device. When it is determined that the terminal device arrives at the target location and the ACT is completed, the EEC receives the ACR complete message, and the EEC switches the AC from the source EAS to the target EAS. The foregoing procedure may alternatively be initiated when it is predicted that the EAS may be overloaded. It should be understood that the service continuity planning ACR may be ACR in which the context information is transmitted to the target EAS in advance because it is predicted that a serving EAS may change. This is not particularly limited in this application.

It should be noted that, in the foregoing listed events of the ACR, the type of the event of the ACR corresponding to some events of the ACR, for example, that the EAS is overloaded, are the common ACR. The type of the event of the ACR corresponding to some events of the ACR, for example, that the terminal device moves and that it is predicted that the terminal device is about to move, are the service continuity planning ACR.

From the foregoing descriptions, it should be understood that the service continuity planning ACR is a prediction behavior. When information about a planned, predicted, or expected behavior is provided on a related entity, ACR planning is performed in advance, so that a seamless continuity service can be provided for the application client when the predicted behavior actually occurs, and service interruption is avoided.

It should be understood that the EES determines the type of the event of the ACR. When the type of the event of the ACR is the service continuity planning ACR, the EES may store the type of the event of the ACR and/or an AC ID corresponding to the ACR and/or the target location corresponding to the ACR, to perform a subsequent procedure.

It should be noted that, when the type of the event of the ACR is the common ACR, the EES may alternatively store the type of the event of the ACR and/or the AC ID corresponding to the ACR.

The EES may store the type of the event of the ACR corresponding to the event of the ACR and/or the AC ID corresponding to the event of the ACR and/or the target location corresponding to the event of the ACR. Alternatively, the EES may store the type of the event of the ACR corresponding to the AC ID and/or the AC ID and/or the target location corresponding to the AC ID. In other words, the EES may perform storing based on the event of the ACR, or may perform storing based on the AC ID.

In this embodiment of this application, a case in which the type of the event of the ACR is the service continuity planning ACR is mainly described. However, this is not limited in this embodiment of this application. The method provided in this embodiment of this application may alternatively be used for another type of the event of the ACR.

S330. The EES determines whether the terminal device moves to the target location.

The EES determines, based on the AC ID corresponding to the ACR and the target location corresponding to the ACR, whether the terminal device moves to the target location, that is, determines the mobility of the terminal device.

It should be understood that the EES may determine the mobility of the terminal device after the ACT is completed, or may determine the mobility of the terminal device before the ACT is completed.

That the EES determines that the ACT is completed may be that it is tacitly approved that the ACT is completed after the EES receives an ACR status update request ACR status update response message.

That the EES determines that the ACT is completed may be that the EES receives the ACR status update request. Optionally, the status update request includes ACT complete indication information, and the EES determines, based on the ACT complete indication information, that the ACT is completed. Optionally, a status update request message may alternatively include an ACT result and cause message. The message may include an ACT success, or an ACT failure and a failure cause. When content of the message is the ACT success, the EES considers that the ACT is completed.

It should be noted that, that the ACT is completed indicates that transmission of application context of the AC corresponding to the ACR from the source EAS to the target EAS is completed.

It should be noted that a bearer message of the ACR complete message is not limited in this embodiment of this application.

Further, the EES determines, based on at least one of the following: the AC ID corresponding to the ACR, the target location corresponding to the ACR, and a current location of the terminal device, whether the terminal moves to the target location. The following provides several possible specific examples in which the EES determines whether the terminal device moves to the target location.

For example, when determining the type of the event of the ACR, the EES may store only an AC ID corresponding to ACR whose type of the event is the service continuity planning ACR (that is, does not store an ID of the common ACR). When the EES determines whether the terminal device moves to the target location, the EES compares the target location corresponding to the AC ID with an obtained current location of the terminal device, to determine whether the terminal device moves to the target location.

It should be noted that the target location of the terminal device may be obtained by the EES, or may be obtained by the EES from another entity.

For another example, when determining the type of the event of the ACR, the EES stores the type of the event of the ACR and the AC ID corresponding to the ACR. When the EES determines whether the terminal device moves to the target location, the type of the event of the ACR is found based on the AC ID corresponding to the ACR. When determining that the type of the event of the ACR is the service continuity planning ACR, the EES compares the target location corresponding to the ACR with an obtained current location of the terminal device, to determine whether the terminal device moves to the target location.

It should be noted that the target location corresponding to the ACR may be obtained by the EES, or may be obtained by the EES from another entity.

For still another example, when the EES determines the type of the event of the ACR, if the type of the event of the ACR is the service continuity planning ACR, the EES sends the AC ID corresponding to the ACR and the target location corresponding to the ACR to the 3GPP core network, and subscribes to a notification message from the 3GPP core network. The notification message is sent to the EES when the 3GPP core network determines that the terminal device moves to the target location corresponding to the ACR. The EES determines, based on whether the notification message is received, whether the terminal device moves to the target location. For specific descriptions of the notification message and a subscription mechanism, refer to the following descriptions.

It should be noted that a specific procedure in which the EES determines, based on the AC ID corresponding to the ACR, the target location corresponding to the ACR, and the current location of the terminal device, whether the terminal device moves to the target location may be a combination of the foregoing examples or recombination of some steps in the foregoing examples. This is not limited in this application.

It should be noted that the terminal device may obtain the current location of the terminal device from the 3GPP core network, or the terminal device may directly obtain mobility information of the terminal device from the 3GPP core network, in other words, the 3GPP core network notifies the terminal device after determining that the terminal device moves to the target location.

For example, the EES may obtain the current location of the terminal device from the 3GPP core network. In a possible implementation, the EES subscribes to a UPPM event from the 3GPP core network. The UPPM event is that, when a data network access identifier (DN Access Identifier, DNAI) of the terminal device changes, the core network sends, to the EES, a DNAI corresponding to the terminal device in this case.

It should be understood that, in correspondence to the foregoing example, that the EES determines whether the terminal device moves to the target location may be that the EES determines, by determining whether the DNAI corresponding to the terminal device in this case is consistent with the DNAI of the target EAS, whether the terminal device moves to the target location. When the DNAI of the terminal device in this case is consistent with the DNAI of the target EAS, the EES determines that the terminal device moves to the target location.

It should be noted that the 3GPP core network may notify the terminal device of the corresponding DNAI in this case by using an EES DNAI change notification EES DNAI change. Optionally, the change notification includes DNAI information corresponding to the terminal device in this case.

For another example, the EES may directly subscribe to the mobility of the terminal device from the 3GPP core network. In a possible implementation, the EES subscribes to the UPPM event from the 3GPP core network. The UPPM event is that the 3GPP core network sends a notification message to the EES when the terminal device moves to the target location (which may be that the DNAI of the terminal device is the same as the DNAI of the target EAS). Optionally, when the EES subscribes to the UPPM event, the target location of the terminal device (which may be DNAI information of the target EAS, or may be the expected location of the terminal device, for example, a geographical location coordinate) is carried in a subscription message, so that the core network determines whether the terminal device moves to the target location of the terminal device.

It should be understood that, in correspondence to the foregoing example, when the EES receives the notification message from the core network, the EES determines that the terminal device moves to the target location of the terminal device.

S340. The EES sends the ACR complete message to the EEC.

If the terminal device moves to the target location, the EES sends the ACR complete message to the terminal device. The ACR complete message may be sent by using an ACR information notification. Optionally, the message may be an ACR complete notification ACR complete notify. Optionally, the ACR complete message may include the type of the event of the ACR and/or the AC ID corresponding to the ACR described in the foregoing steps, and indicates that the terminal device has moved to the target location corresponding to the AC ID. Optionally, the ACR complete message is sent after the ACT is completed.

It should be understood that a sequence of determining, by the EES, that the terminal device moves to the target location and determining, by the EES, that the ACT is completed may not be limited in this embodiment of this application.

S350. The EEC receives the ACR complete message, disconnects the AC from the source EAS, and connects the AC to the target EAS.

Optionally, the EEC receives the ACR complete message, and forwards the ACR complete message to the AC. The AC disconnects from the source EAS and connects to the target EAS based on the ACR complete message.

Optionally, after receiving the ACR complete message, the EEC generates a notification message based on the ACR complete message, and sends the notification message to the AC, where the notification message indicates the AC to disconnect from the source EAS and/or connect to the target EAS. The AC receives the notification message, and disconnects from the source EAS and/or connects to the target EAS based on the notification message.

It should be noted that the forwarded ACR complete message or notification message may be sent by the EEC to the AC through the EDGE-5 interface in the system architecture described in FIG. 1, or may be sent to the AC through another interface. A sending manner is not particularly limited in this embodiment of this application.

It should be noted that, the EEC receives the ACR complete message, and the EEC may determine that the ACT is completed and that the terminal device moves to the target location, and then performs a subsequent communication procedure. The EEC may alternatively receive the ACR complete message. In other words, it is tacitly approved that the subsequent communication procedure is performed when an indication is received.

It should be noted that, in this embodiment of this application, the AC ID may alternatively be a UE ID of the terminal device or the like. This is not limited in this application.

According to the method provided in this embodiment of this application, the EES determines the mobility of the terminal device, and switches the AC on the terminal device from the source EAS to the target EAS after determining that the terminal device moves to the target location. This avoids service interruption caused by premature switching of the AC from the source EAS to the target EAS (for example, service interruption caused because the ACT is completed but the terminal device has not moved to the target location), and ensures service continuity.

FIG. 4 is a schematic diagram of another example of an application context relocation method according to an embodiment of this application. In the method shown in FIG. 4, an EAS determines a type of ACR, and an EES determines mobility of a terminal device. As shown in FIG. 4, the method 400 includes the following steps.

S410. An EEC sends first indication information or second indication information to the EES, where the first indication information indicates the EES to determine the mobility of the terminal device, and the second indication information indicates that the EEC does not support determining of the mobility of the terminal device.

Specific meanings of the first indication information and the second indication information are similar to those of step S310 in the method 300. For details, refer to related descriptions in S310.

S420. The EAS determines a type of an event of the ACR.

That the EAS determines the type of the event of the ACR is similar to that the EES determines the type of the event of the ACR of step S320 in the method 300. For details, refer to related descriptions in S320, and only the EES of step S320 needs to be replaced with the EAS.

Optionally, that the EAS determines the type of the event of the ACR may be indicated by the EES by sending indication information.

The EES sends the indication information to the EAS, to indicate the EAS to determine the type of the event of the ACR.

Optionally, the indication information may be sent through an EDGE-3 interface in the system architecture described in FIG. 1.

A related message may be an ACR monitoring event ACR monitoring event, a UPPM event notification, an ACR facilitation event notification, or a separate newly added piece of signaling in an ACR management event notification message. This is not limited in this embodiment of this application.

That the EAS determines the type of the event of the ACR may alternatively be indicated without sending indication information by the EES.

Optionally, that the EAS determines the type of the event of the ACR may be tacitly approved by the EAS.

Optionally, that the EAS determines the type of the event of the ACR may be: when a related entity (for example, an AC, the EEC, the EES, or the EAS) selects an ACR scenario/solution, the EAS is selected to trigger/perform the ACR scenario, and it is determined that the EAS determines the type of the event of the ACR.

It should be noted that, after the EAS determines the type of the event of the ACR, the EAS may cache the type of the event of the ACR and/or an AC ID corresponding to the ACR and/or a target location corresponding to the ACR.

A method for obtaining, by the EAS, the target location corresponding to the ACR is similar to a method for obtaining, by the EES, the target location of the terminal device of step S310 in the method 300. For details, refer to related descriptions of step S310, and only the EES needs to be replaced with the EAS.

S430. The EAS sends, to the EES, the type of the event of the ACR and/or the AC ID corresponding to the ACR and/or the target location corresponding to the ACR.

Optionally, information such as the type of the event of the ACR and/or the AC ID corresponding to the ACR and/or the target location corresponding to the ACR that are/is sent by the EAS to the EES may be included in an existing message such as an ACR status update request sent by the EAS to the EES. Optionally, the information such as the type of the event of the ACR and/or the AC ID corresponding to the ACR and/or the target location corresponding to the ACR that are/is sent by the EAS to the EES may be included in a separate newly added piece of signaling. This is not limited in this application.

It should be noted that, a sending occasion of sending, by the EAS to the EES, the information such as the type of the event of the ACR and/or the AC ID corresponding to the ACR and/or the target location corresponding to the ACR may be: after ACT is completed, or when the ACT is not completed.

It should be understood that after receiving the information such as the type of the event of the ACR and/or the AC ID corresponding to the ACR and/or the target location corresponding to the ACR that are/is sent by the EAS, the EES may store the information such as the type of the event of the ACR and/or the AC ID corresponding to the ACR and/or the target location corresponding to the ACR, to determine the mobility of the terminal device.

S440. The EES determines whether the terminal device moves to the target location.

This step is similar to step S330 in the method 300. For details, refer to related descriptions in S330.

S450. The EES sends an ACR complete message to the EEC.

This step is similar to step S340 in the method 300. For details, refer to related descriptions in S340.

It should be specially noted that, in this step, an occasion at which the EES sends the ACR complete message to the EEC may be different from that of step S340. The difference is related to a sending occasion at which the EAS sends, to the EES of step S430, the information such as the type of the event of the ACR and/or the AC ID corresponding to the ACR and/or the target location corresponding to the ACR.

If the EAS sends the foregoing information to the EES after determining that the ACT is completed, the EES may tacitly approve that the EES sends, without sensing whether the ACT is completed, the ACR complete message to the EEC after receiving the foregoing information and determining that the terminal device moves to the target location. If the EAS may send the foregoing information to the EES when the ACT is completed or not completed, the EES sends the ACR complete message to the EEC after determining that the terminal device moves to the target location and that the ACT is completed.

S460. The EEC receives the ACR complete message, disconnects an AC from a source EAS, and connects the AC to a target EAS.

This step is similar to step S350 in the method 300. For details, refer to related descriptions in S350.

According to the method provided in this embodiment of this application, the EAS determines the type of the ACR, and sends, to the EES, some related information needed for the determining of the mobility of the terminal device, and the EES determines the mobility of the terminal device. This ensures that after the terminal device moves to the target location, the AC on the terminal device is switched from the source EAS to the target EAS, avoids service interruption caused by premature switching of the AC from the source EAS to the target EAS, and ensures service continuity.

Figure 5:
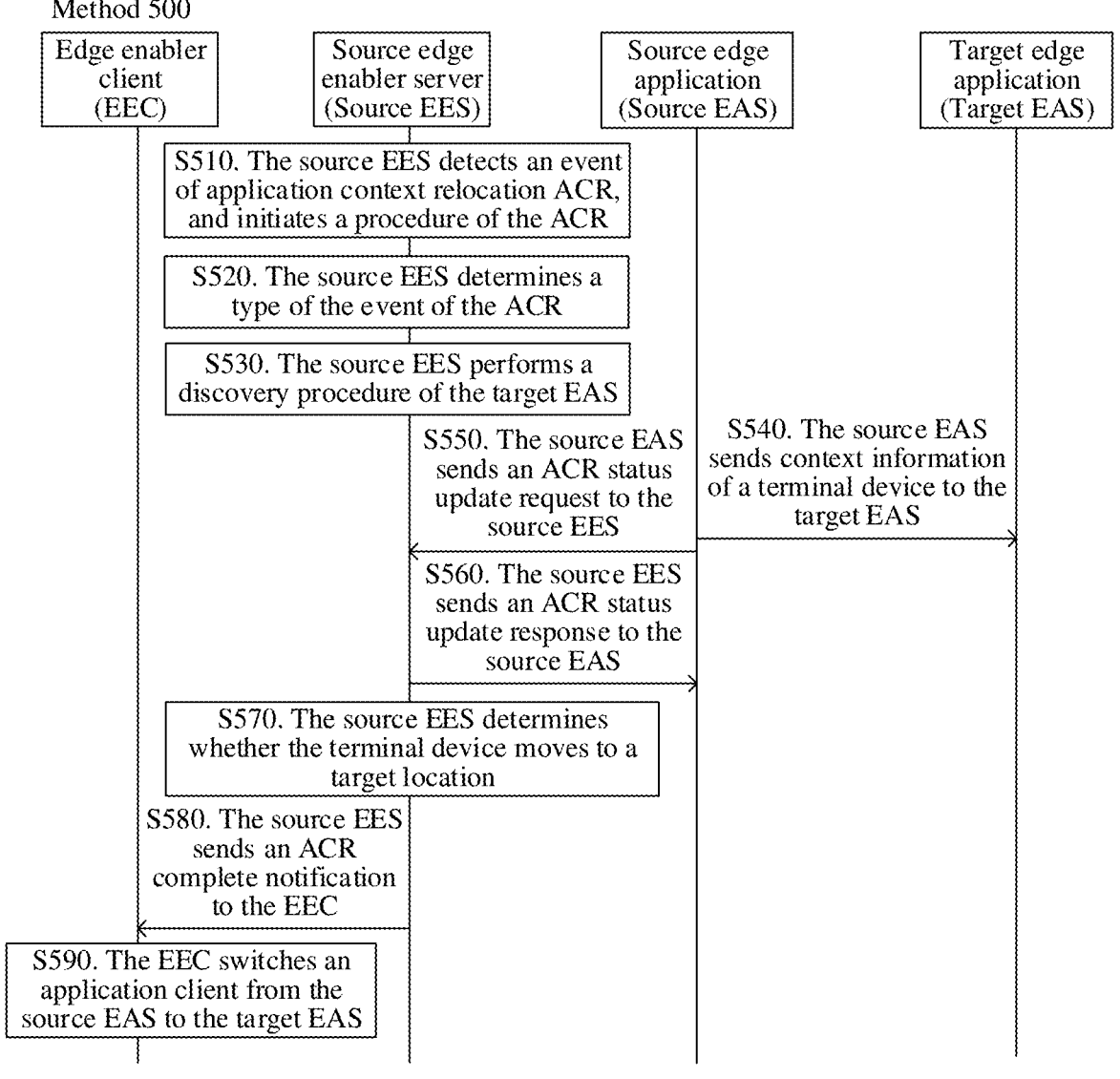
FIG. 5 is a schematic diagram of still another example of an application context relocation method according to an embodiment of this application.

FIG. 5 is a schematic diagram of still another example of an application context relocation method according to an embodiment of this application. The method shown in FIG. 5 is a specific embodiment corresponding to the method 300. As shown in FIG. 5, the method 500 includes the following steps.

S510. A source EES detects an event of ACR and initiates a procedure of the ACR.

It should be noted that before this step, an AC of a terminal device is connected to a source EAS, and an application corresponding to the AC runs.

The source EES detects the event of the ACR and initiates the procedure of the ACR. It should be noted that the event of the ACR may be, for example, that the EAS is overloaded, that the terminal device moves, that the terminal device is about to move, or that the source EAS cannot provide a service.

For example, that the source EES detects the event of the ACR may be that the source EES detects that a location of the terminal device changes.

For another example, that the source EES detects the event of the ACR may be that the source EES detects that the terminal device moves out of a service range of a current EAS or the source EAS.

For still another example, that the source EES detects the event of the ACR may be that the source EES receives a UPPM notification sent by a 3GPP core network, or that the source EES receives a notification sent by an EAS or an EEC, where the notification notifies the source EES that the event of the ACR occurs.

For yet another example, the source EES determines, based on a future predicted location of the terminal device, that the ACR may be needed, or another detection entity determines, based on the future predicted location of the terminal device, that the ACR may be needed to notify the source EES.

S520. The source EES determines a type of the event of the ACR.

It should be noted that this step is similar to step S320 in the method 300. For details, refer to related descriptions of step S320, and only the EES of step S320 needs to be replaced with the source EES.

Optionally, the source EES may further receive first indication information or second indication information sent by the EEC. The first indication information indicates the source EES to determine mobility of the terminal device, and the second indication information indicates that the EEC of the terminal device does not support determining of the mobility of the terminal device. Specific meanings of the first indication information and the second indication information are similar to the meanings indicated of step S310 in the method 300. For details, refer to related descriptions of step S310.

S530. The source EES performs a discovery procedure of a target EAS.

The source EES sends a retrieve EES request to an ECS, where the request includes one or more of location information of the terminal device or an identifier of the terminal device, an EAS ID of the source EAS, a target DNAI, an AC configuration file, and the like, to identify a candidate target EES having an EAS that may be used to serve a given AC in the terminal device.

The ECS determines the candidate target EES based on parameters (such as the EAS ID and the target DNAI) and information of an expected location of the terminal device in the request. It should be understood that, if the request does not include the expected location of the terminal device, the ECS does not know the expected location of the terminal device, and the ECS may interact with the 3GPP core network to retrieve the expected location of the terminal device. A specific method is similar to the foregoing that the EES obtains the expected location of the terminal device. For details, refer to related descriptions of step S310, and only the EES needs to be replaced with the ECS.

Further, the ECS sends a Retrieve EES response to the source EES, where the response message may include the EAS ID of the source EAS, a candidate target EES information list, and the like. The candidate target EES information list may include one or more target EESs, and the list includes an endpoint of each candidate target EES, for example, an IP address of the candidate target EES.

Further, the source EES performs the discovery procedure of the target EAS.

The source EES sends a target EAS discovery request to the candidate target EES retrieved by the ECS. The discovery request may include an identifier EES ID of the source EES and a security credential, and may further include a target EAS discovery filter. The target EAS discovery filter may include a parameter of a target EAS expected by the source EES or another requirement. It should be noted that the source EES may send the discovery request to the one or more EESs in the candidate target EES list.

Further, the candidate target EES receives the discovery request, discovers the target EAS based on the discovery request, and feeds back related information about the target EAS to the source EES. The candidate target EES may filter other EASs based on the discovery filter, and finally select the target EAS.

It should be noted that the expected location of the terminal device may help the source EES discover the target EAS. After the source EES determines the target EAS, a service range of the target EAS may be determined. In some embodiments, the expected location of the terminal device may be equivalent to the service range of the target EAS, and the expected location of the terminal device may alternatively be a location point in a location of the service range of the target EAS. This is not particularly limited in this embodiment of this application.

S540. The source EAS sends, to the target EAS, context information of the AC corresponding to the ACR.

That the source EAS sends, to the target EAS, the context information corresponding to the AC corresponding to the ACR may be that the source EAS sends, to the target EAS, the context information corresponding to the AC, or may be that the source EES assists the source EAS in sending, to the target EES through an EDGE-9 interface, the context information corresponding to the AC, and then the target EAS obtains the application context information from the target EES.

S550. The source EAS sends an ACR status update request to the source EES.

It should be noted that the status update request is sent after the application context information has been transmitted from the source EAS to the target EAS, that is, sent after ACT is completed. It should be noted that, the ACR status update request may indicate that the ACT is completed and a subsequent communication procedure is performed. Alternatively, a separate information element included in the ACR status update request may indicate that the ACT is completed and the subsequent communication procedure is performed. For details, refer to related descriptions of the ACT complete message and the status update request message of step S330 in the method 300. Details are not described herein again.

S560. The source EES sends an ACR status update response to the source EAS.

S570. The source EES determines whether the terminal device moves to a target location.

This step is similar to step S330 in the method 300. For details, refer to related descriptions of step S330, and only the EES needs to be replaced with the source EES.

It should be noted that the step of determining whether the terminal device moves to the target location may alternatively be performed by the target EES. Before determining whether the terminal device moves to the target location, the target EES receives, from the source EES, information such as the type of the event of the ACR and/or an AC ID corresponding to the ACR and/or the target location corresponding to the ACR. Optionally, the target EES may store the type of the event of the ACR and/or the AC ID corresponding to the ACR and/or the target location corresponding to the ACR.

A method for determining, by the target EES, whether the terminal device moves to the target location is similar to step S330 in the method 300. For details, refer to related descriptions of step S330, and only the EES needs to be replaced with the target EES.

S580. The source EES sends an ACR complete notification to the EEC.

This step is similar to step S340 in the method 300. For details, refer to related descriptions in S340, and only the EES needs to be replaced with the source EES.

It should be understood that when the target EES determines the mobility of the terminal device, this step is that the target EES sends the ACR complete notification to the EEC. This step is similar to step S340 in the method 300. For details, refer to related descriptions in S340, and only the EES needs to be replaced with the target EES.

S590. The EEC receives an ACR complete message, and the EEC switches the AC from the source EAS to the target EAS.

This step is similar to step S350 in the method 300. For details, refer to related descriptions in S350.

Figure 6:
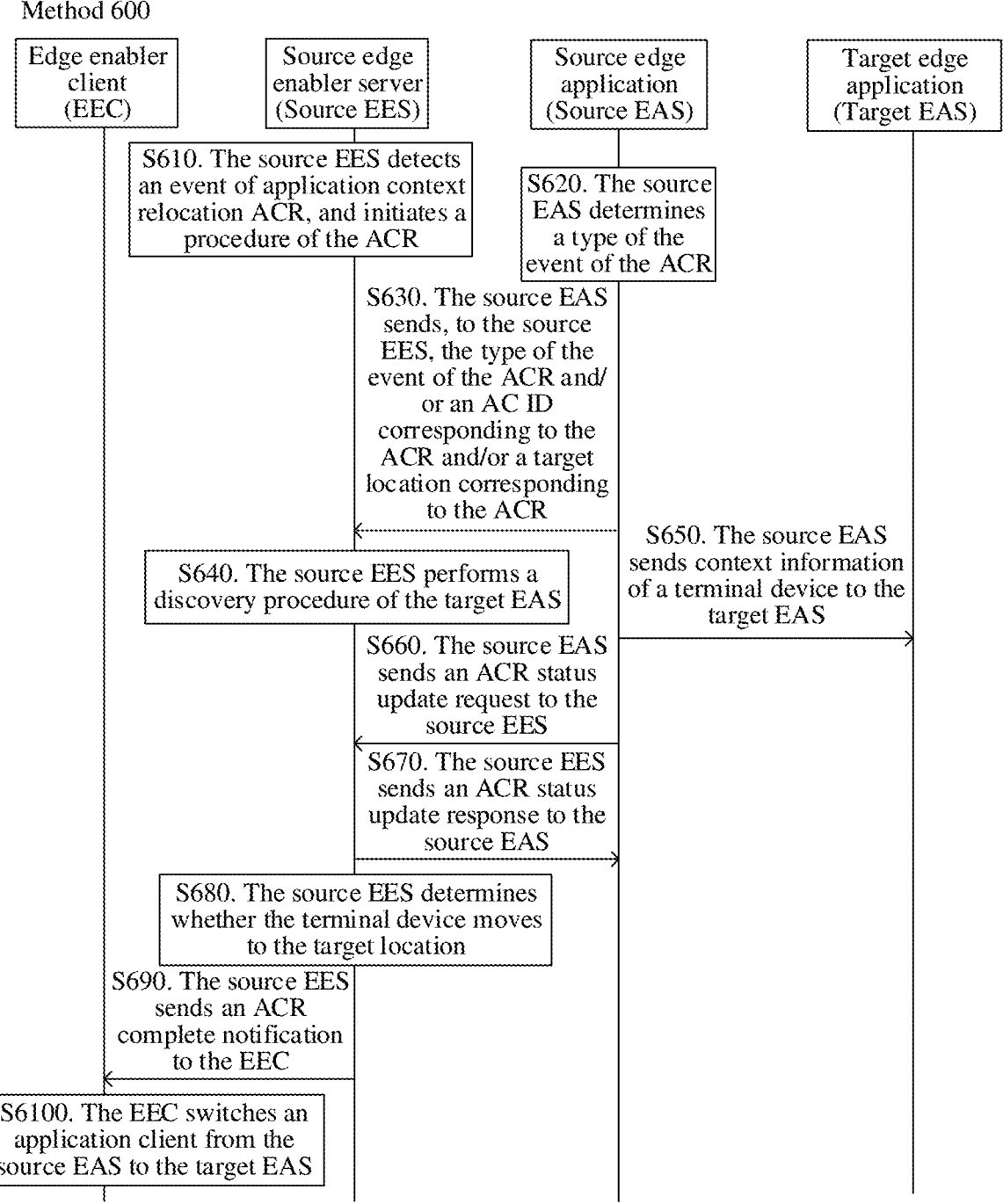
FIG. 6 is a schematic diagram of yet another example of an application context relocation method according to an embodiment of this application.

FIG. 6 is a schematic diagram of yet another example of an application context relocation method according to an embodiment of this application. The method shown in FIG. 6 is a specific embodiment of the method 400. As shown in FIG. 6, the method 600 includes the following steps.

S610. A source EES detects an event of ACR and initiates a procedure of the ACR.

This step is similar to step S510 in the method 500. For details, refer to related descriptions of step S510.

S620. A source EAS determines a type of the event of the ACR.

It should be noted that this step is similar to step S420 in the method 400. For details, refer to related descriptions in the method S420, and only the EAS needs to be replaced with the source EAS.

S630. The source EAS sends, to the source EES, the type of the event of the ACR and/or an AC ID corresponding to the ACR and/or a target location corresponding to the ACR.

It should be noted that this step is similar to step S430 in the method 400. For details, refer to related descriptions in the method S430, only the EAS needs to be replaced with the source EAS, and the EES needs to be replaced with the source EES.

S640. The source EES performs a discovery procedure of a target EAS.

The discovery procedure is similar to step S530 in method 500. For details, refer to related descriptions in S530.

S650. The source EAS sends, to the target EAS, context information of an AC corresponding to the ACR.

This step is similar to step S540 in the method 500. For details, refer to related descriptions of step S540.

S660. The source EAS sends an ACR status update request to the source EES.

This step is similar to step S550 in the method 500. For details, refer to related descriptions of step S550.

S670. The source EES sends an ACR status update response to the source EAS.

S680. The source EES determines whether the terminal device moves to the target location.

This step is similar to step S560 in the method 500. For details, refer to related descriptions of step S560.

S690. The source EES sends an ACR complete notification to an EEC.

This step is similar to step S570 in the method 500. For details, refer to related descriptions of step S570.

S6100. The EEC receives an ACR complete message, and switches the AC from the source EAS to the target EAS.

This step is similar to step S580 in the method 500. For details, refer to related descriptions of step S580.

Figure 7:
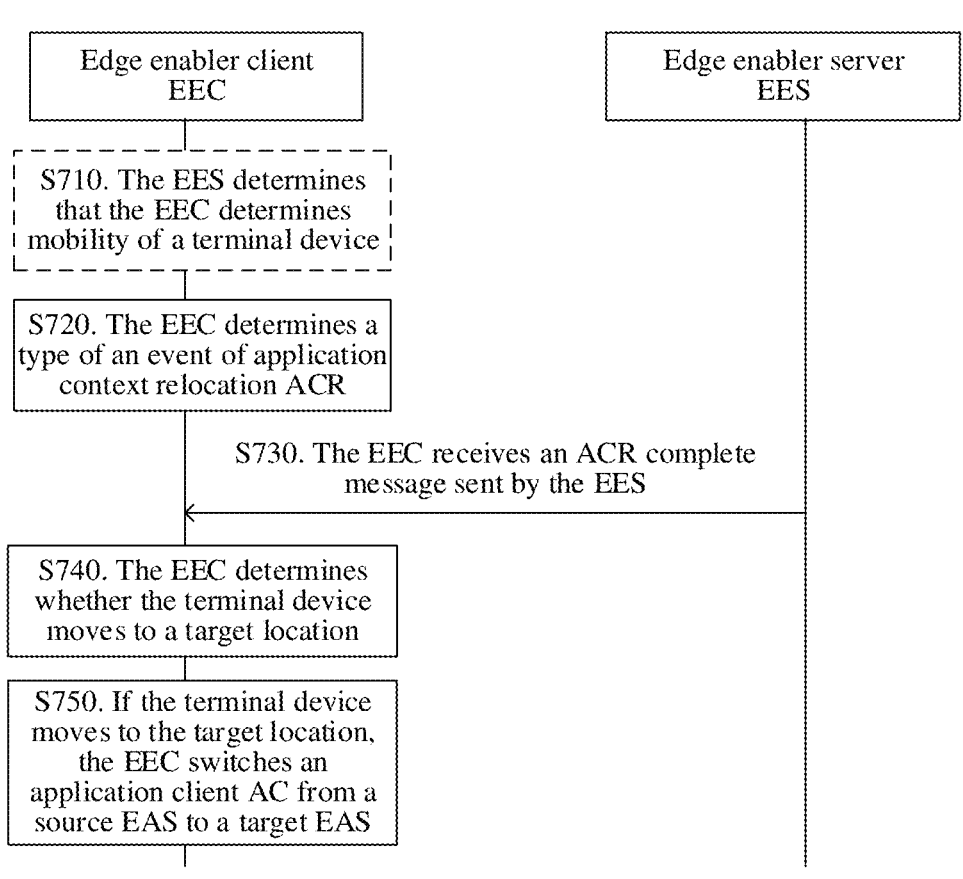
FIG. 7 is a schematic diagram of still yet another example of an application context relocation method according to an embodiment of this application.

FIG. 7 is a schematic diagram of still yet another example of an application context relocation method according to an embodiment of this application. In the method shown in FIG. 7, an EEC determines a type of an event of ACR, and the EEC determines mobility of a terminal device. As shown in FIG. 7, the method 700 includes the following steps.

S710. An EES determines that the EEC determines the mobility of the terminal device.

Optionally, the EES tacitly approves that the EEC determines the mobility of the terminal device.

Optionally, when the ACR method is determined, the EEC is determined to determine the mobility of the terminal device.

For specific descriptions of determining of the mobility of the terminal device, refer to related descriptions of step S310 in the method 300. Details are not described herein again.

It should be noted that this step is optional.

S720. The EEC determines the type of the event of the ACR.

It should be noted that this step is similar to the descriptions of step S320 in the method 300. For details, refer to the related descriptions of step S320, and only the EES needs to be replaced with the EEC.

It should be noted that, when the EEC obtains a target location of the terminal device, in addition to obtaining the target location of the terminal device from the method described of step S320, the EEC may further obtain the target location of the terminal device from the EEC, in other words, a terminal device to which the EEC belongs.

S730. The EEC receives an ACR complete message sent by the EES.

The ACR complete message may be sent by using an ACR information notification. Optionally, the ACR complete message may be an ACR complete notification ACR complete notify. The ACR complete message indicates that ACT is completed, that is, context information of an AC corresponding to the ACR is transmitted from a source EAS to a target EAS. Optionally, the ACT complete message may be a specific information element, and the information element may be included in an ACR status update request: or may be a separate newly added information element. An ACT complete message may alternatively be tacitly approved. In other words, when the EES receives, for example, the ACR status update request, it is tacitly approved that the ACT complete message is received. The information element of the ACT complete message or the tacitly approved ACT complete message may be sent by an EAS to the EES, and then forwarded by the EES to the EEC: or may be sent by the EAS to the EES, and then the EES generates a separate piece of signaling and forwards the signaling to the EEC: or the EES sends an ACR complete notification to the EEC, indicating that the ACT is completed.

It should be noted that a sequence of step S730 and the following step S740 is not limited. S730 may be performed before S740, or S740 may be performed before S730.

S740. The EEC determines whether the terminal device moves to the target location.

That the EEC determines whether the terminal device moves to the target location is basically the same as a method for determining, by the EES, whether the terminal device moves to the target location of step S330 in the method 300, and only the EES needs to be replaced with the EEC.

It should be noted that, in addition to obtaining location information of the terminal device from 3GPP core network information like the EES, the EEC, in other words, a terminal device to which the EEC belongs, may alternatively obtain the location information of the terminal device.

It should be noted that, the sequence of step S740 and step S730 is not limited.

S750. If the terminal device moves to the target location, the AC is switched from the source EAS to the target EAS.

In some embodiments, the EEC determines that the terminal device moves to the target location. Optionally, the EEC determines that the ACT is completed. For example, the EEC receives the ACR complete message and determines that the ACT is completed, and the EEC switches the AC from the source EAS to the target EAS.

It should be noted that, a mechanism of notifying, by the EEC, the AC to perform switching is the same as the descriptions of step S340 in the method 300. For details, refer to the related descriptions of step S340.

According to the method provided in this embodiment of this application, the EEC determines the mobility of the terminal device, and ensures that after the terminal device moves to the target location, the AC corresponding to the ACR is switched from the source EAS to the target EAS. This avoids service interruption caused by premature switching of the AC from the source EAS to the target EAS, and ensures service continuity. In addition, because the EEC belongs to the terminal device, a method for obtaining, by the EEC, a location of the terminal device to determine the mobility is simpler, and signaling overheads for obtaining the location information can be reduced to some extent.

Figure 8:
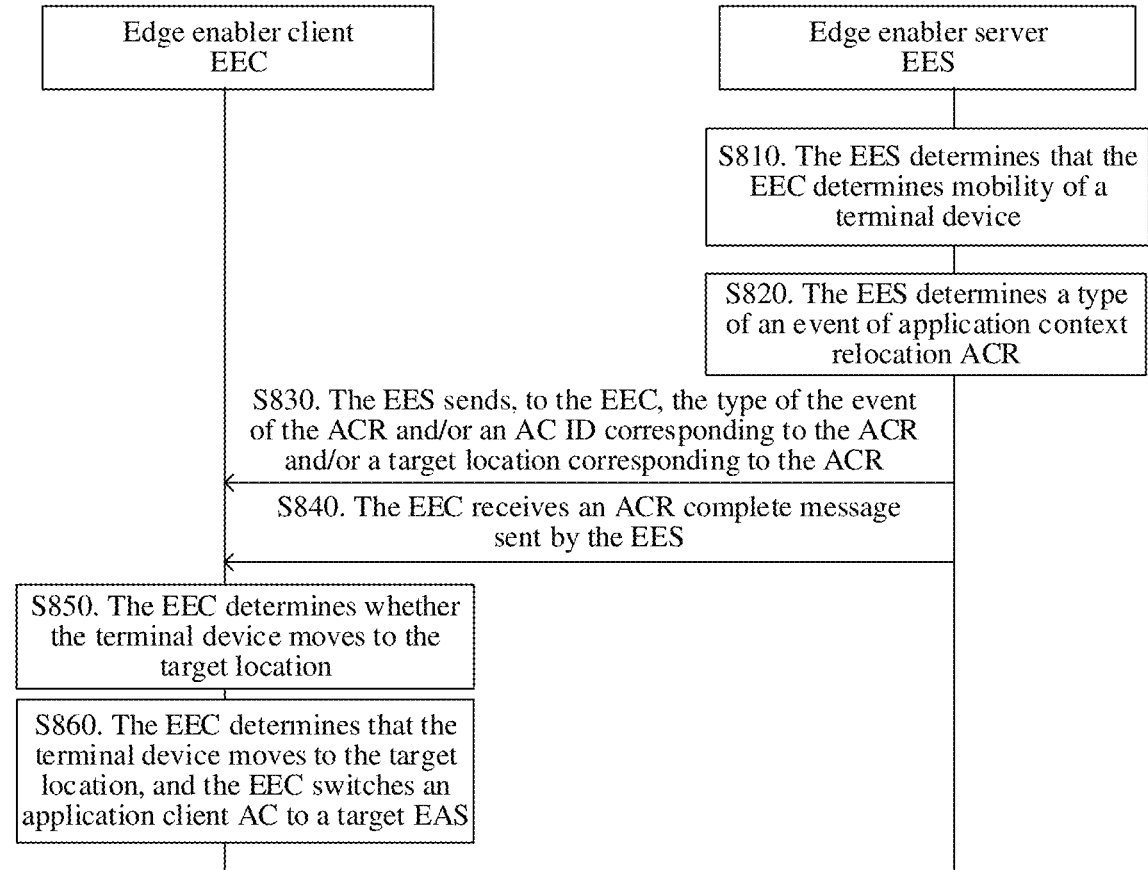
FIG. 8 is a schematic diagram of a further example of an application context relocation method according to an embodiment of this application.

FIG. 8 is a schematic diagram of a further example of an application context relocation method according to an embodiment of this application. In the method shown in FIG. 8, an EES determines a type of an event of ACR, and an EEC determines mobility of a terminal device. As shown in FIG. 8, the method 800 includes the following steps.

S810. The EES determines that the EEC determines the mobility of the terminal device. S820. The EES determines the type of the event of the ACR.

It should be noted that this step is similar to step S420 corresponding to the method 400. For details, refer to the descriptions of step S420, and only the EAS needs to be replaced with the EES.

S830. The EES sends, to the EEC, the type of the event of the ACR and/or an AC ID corresponding to the ACR and/or a target location corresponding to the ACR.

It should be noted that this step is similar to step S430 corresponding to the method 400. For details, refer to related descriptions of step S430, only the EAS needs to be replaced with the EES, and the EES needs to be replaced with the EEC.

In some embodiments, of step S810 or a configuration phase, the EEC may not be indicated to determine the mobility of the terminal device. It is tacitly approved in this step that when the EES sends information about some content to the EEC, it is tacitly approved that the EEC determines the mobility of the terminal device. By way of example and not limitation, when the EES determines the type of the event of the ACR, if the EES determines that the ACR is service continuity planning ACR, the EES sends, to the EEC, the type of the event of the ACR and/or the AC ID corresponding to the ACR and/or the target location corresponding to the ACR, and the EEC tacitly approves that determining of the mobility of the terminal device corresponding to the ACR is needed. In other words, when an AC corresponding to the ACR is switched, the mobility of the terminal device first needs to be determined.

S840. The EEC receives an ACR complete message sent by the EES.

It should be noted that this step is similar to step S730 in the method 700. For details, refer to related descriptions of S730.

S850. The EEC determines whether the terminal device moves to the target location. That the EEC determines whether the terminal device moves to the target location is basically the same as a method for determining, by the EES, whether the terminal device moves to the target location of step S330 in the method 300, and only the EES needs to be replaced with the EEC. It should be noted that, different from step S330, the EEC does not receive an ACR status update request or an ACT complete notification.

It should be noted that, in addition to obtaining location information of the terminal device from 3GPP core network information like the EES, the EEC, in other words, a terminal device to which the EEC belongs, may alternatively obtain the location information of the terminal device.

It should be noted that, a sequence of step S850 and step S860 is not limited.

S860. If the EEC determines that the terminal device moves to the target location, the EEC switches the AC to a target EAS.

In some embodiments, the EEC determines that the terminal device moves to the target location. Optionally, the EEC determines that ACT is completed. For example, the EEC receives an ACR complete message and determines that the ACT is completed, and the EEC switches the AC from a source EAS to the target EAS.

It should be noted that, a mechanism of notifying, by the EEC, the AC to perform switching is the same as the descriptions of step S340 in the method 300. For details, refer to the related descriptions of step S340.

FIG. 9 is a schematic diagram of a still further example of an application context relocation method according to an embodiment of this application. The method shown in FIG. 9 is a specific embodiment of the method 700. As shown in FIG. 9, the method 900 includes the following steps.

S910. An EEC detects an event of ACR and initiates a procedure of the ACR.

It should be noted that this step is similar to step S510 in the method 500. For details, refer to the descriptions of step S510, and only the source EES needs to be replaced with the EEC.

S920. The EEC determines a type of the event of the ACR.

It should be noted that this step is similar to step S320 in the method 300. For details, refer to related descriptions of step S320, and only the EES needs to be replaced with the EEC. S930. The EEC performs a discovery procedure of a target EAS.

The EEC sends an EAS discovery request to the EES. The EAS discovery request may include an EEC ID and a security credential, and may further include EAS discovery filter. EAS discovery filter is used to retrieve information about a specific EAS or a specific type of an EAS (for example, a game application program).

Further, after receiving the EAS discovery request sent by the EEC, the EES checks whether the EEC is authorized to discover a requested EAS. If the EEC is authorized, the EES identifies an EAS based on EAS discovery filter provided by the EEC and a location of the terminal device (where the location of the terminal device may be obtained from a 3GPP core network).

It should be noted that, if the EEC does not provide EAS discovery filter, the EES may identify the EAS based on specific service information of the terminal device and the location of the terminal device on the EES, or the EES may identify the EAS by applying an ECSP policy. If the EES cannot determine EAS information based on information in the EAS discovery request, the specific service information of the terminal device on the EES, or the ECSP policy, the EES may refuse to serve the EEC and provide a corresponding reason.

Further, if the EES determines that the EES can provide a service for the EEC, the EES sends an EAS discovery response to the EEC, where the EAS discovery response includes information about a discovered EAS and endpoint information of the discovered EAS.

Correspondingly, after receiving a response from the EEC, the EEC routes an application data volume to the EAS based on information about an endpoint to be used.

It should be noted that the EAS in this step is the target EAS.

It should be noted that the EES may be a source EES, or may be a target EES.

S940. A source EAS sends, to the target EAS, context information of an AC corresponding to the ACR.

This step is similar to step S540 in the method 500. For details, refer to related descriptions of step S540.

S950. The target EAS sends an ACR status update request to the target EES.

It should be noted that this step is similar to step S550 in the method 500. For details, refer to related descriptions in S550, only the source EAS needs to be replaced with the target EAS, and the source EES needs to be replaced with the target EES. It should be noted that, in this step, the target EAS may alternatively send the ACR status update request to the source EES or the source EAS.

S960. The target EES sends an ACR status update response to the target EAS.

S970. The target EES sends an ACR complete notification to the EEC.

This step is similar to step S730 in the method 700. For details, refer to the descriptions of S730, and only the EES needs to be replaced with the target EES.

S980. The EEC determines whether the terminal device moves to a target location.

That the EEC determines whether the terminal device moves to the target location is basically the same as a method for determining, by the EES, whether the terminal device moves to the target location of step S330 in the method 300, and only the EES needs to be replaced with the EEC.

It should be noted that, in addition to obtaining location information of the terminal device from 3GPP core network information like the EES, the EEC, in other words, a terminal device to which the EEC belongs, may alternatively obtain the location information of the terminal device.

It should be noted that, a sequence of step S970 and step S980 is not limited.

S990. If the terminal device moves to the target location, the AC is switched from the source EAS to the target EAS.

In some embodiments, the EEC determines that the terminal device moves to the target location. Optionally, the EEC determines that ACT is completed. For example, the EEC receives an ACR complete message and determines that the ACT is completed, and the EEC switches the AC from the source EAS to the target EAS.

It should be noted that, a mechanism of notifying, by the EEC, the AC to perform switching is the same as the descriptions of step S340 in the method 300. For details, refer to the related descriptions of step S340.

FIG. 10 is a schematic diagram of a yet further example of an application context relocation method according to an embodiment of this application. The method shown in FIG. 10 is a specific embodiment of the method 800. As shown in FIG. 10, the method 1000 includes the following steps.

S1010. An EEC detects an event of ACR, and initiates a procedure of the ACR.

It should be noted that this step is similar to step S510 in the method 500. For details, refer to the descriptions of step S510, and only a source EES needs to be replaced with the EEC.

S1020. An EES determines a type of the event of the ACR.

It should be noted that this step is similar to step S420 corresponding to the method 400. For details, refer to the descriptions of step S420, and only the EAS needs to be replaced with the EES.

S1030. The EES sends, to the EEC, the type of the event of the ACR and/or an AC ID corresponding to the ACR and/or a target location corresponding to the ACR.

It should be noted that this step is similar to step S430 corresponding to the method 400. For details, refer to related descriptions of step S430, only the EAS needs to be replaced with the EES, and the EES needs to be replaced with the EEC.

In some embodiments, of step S810 or a configuration phase, the EEC may not be indicated to determine mobility of a terminal device. It is tacitly approved in this step that when the EES sends information about some content to the EEC, it is tacitly approved that the EEC determines the mobility of the terminal device. By way of example and not limitation, when the EES determines the type of the event of the ACR, if the EES determines that the ACR is service continuity planning ACR, the EES sends, to the EEC, the type of the event of the ACR and/or the AC ID corresponding to the ACR and/or the target location corresponding to the ACR, and the EEC tacitly approves that determining of the mobility of the terminal device corresponding to the ACR is needed. In other words, when an AC corresponding to the ACR is switched, the mobility of the terminal device first needs to be determined.

S1040. The EEC performs a discovery procedure of a target EAS.

This process is similar to that of step S930 in the method 900. For details, refer to related descriptions of step S930.

S1050. A source EAS sends, to the target EAS, context information of the AC corresponding to the ACR.

This step is similar to step S540 in the method 500. For details, refer to related descriptions of step S540.

The source EAS sends the context information corresponding to the AC on the terminal device to the target EAS.

S1060. The target EAS sends an ACR status update request to a target EES.

It should be noted that this step is similar to step S550 in the method 500. For details, refer to related descriptions in S550, only the source EAS needs to be replaced with the target EAS, and the source EES needs to be replaced with the target EES.

S1070. The target EES sends an ACR status update response to the target EAS.

S1080. The target EES sends an ACR complete notification to the EEC.

This step is similar to step S730 in the method 700. For details, refer to the descriptions of S730, and only the EES needs to be replaced with the target EES.

S1090. The EEC determines whether the terminal device moves to the target location.

That the EEC determines whether the terminal device moves to the target location is basically the same as a method for determining, by the EES, whether the terminal device moves to the target location of step S330 in the method 300, and only the EES needs to be replaced with the EEC.

It should be noted that, in addition to obtaining location information of the terminal device from 3GPP core network information like the EES, the EEC, in other words, a terminal device to which the EEC belongs, may alternatively obtain the location information of the terminal device.

It should be noted that, a sequence of step S970 and step S980 is not limited.

S1100. If the terminal device moves to the target location, the AC is switched from the source EAS to the target EAS.

In some embodiments, the EEC determines that the terminal device moves to the target location. Optionally, the EEC determines that ACT is completed. For example, the EEC receives an ACR complete message and determines that the ACT is completed, and the EEC switches the AC from the source EAS to the target EAS.

It should be noted that, a mechanism of notifying, by the EEC, the AC to perform switching is the same as the descriptions of step S340 in the method 300. For details, refer to the related descriptions of step S340.

Figure 11:
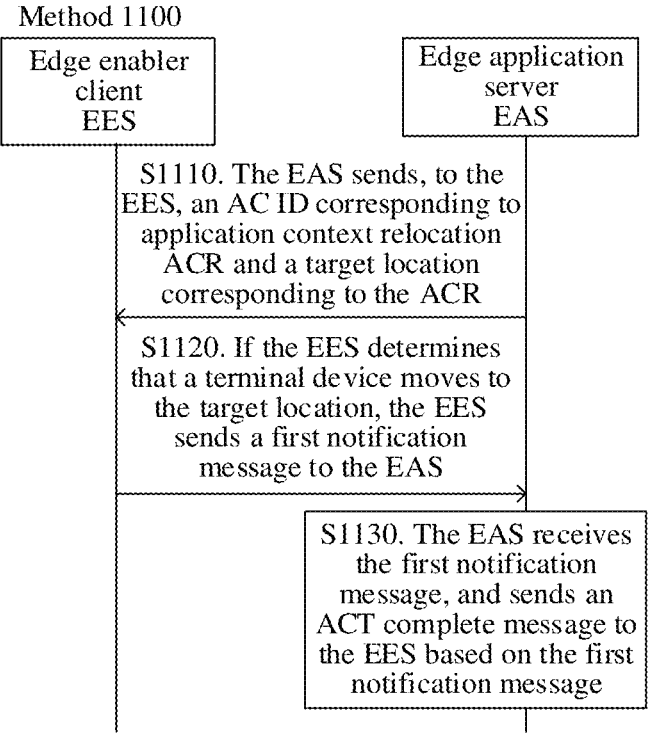
FIG. 11 is a schematic diagram of a still yet further example of an application context relocation method according to an embodiment of this application.

FIG. 11 is a schematic diagram of a still yet further example of an application context relocation method according to an embodiment of this application. In the method shown in FIG. 11, an EAS subscribes to mobility of a terminal device from an EES. When receiving a notification message and determining that the terminal device moves to a target location, the EAS continues a subsequent communication procedure. As shown in FIG. 11, the method 1100 includes the following steps.

S1110. The EAS sends, to the EES, an AC ID corresponding to ACR and the target location corresponding to the ACR.

It should be noted that the EES determines, based on the AC ID corresponding to the ACR, the target location corresponding to the ACR, and a current location of the terminal device that are sent by the EAS, whether the terminal device arrives at the target location. A determining process and a specific example are similar to step S330 in the method 300. For details, refer to the descriptions of step S330 in which location information of the terminal device is received from a 3GPP core network to determine or a notification message is directly obtained from the 3GPP core network to determine that the terminal device moves to the target location.

It should be noted that a method for obtaining, by the EAS, the target location of the terminal device is similar to step S310 in the method 300, and only the EES needs to be replaced with the EAS. For details, refer to related descriptions of step S310.

S1120. If the EES determines that the terminal device moves to the target location, the EES sends a first notification message to the EAS.

The first notification message indicates the terminal device to move to the target location.

It should be noted that, optionally, the EAS may send a subscription message to the EES in advance. The subscription message indicates the EES to send the first notification message to the EAS when the EES receives the AC ID corresponding to the ACR and the target location corresponding to the ACR and needs to determine that the terminal device moves to the target location. Optionally, the EAS may send the subscription message to the EES. The subscription message indicates the EES to send the first notification message to the EAS when determining that the terminal device moves to the target location. The subscription message carries the AC ID corresponding to the ACR and the target location corresponding to the ACR. Optionally, after receiving the AC ID corresponding to the ACR and the target location corresponding to the ACR that are sent by the EAS, and when determining that the terminal device moves to the target location, the EES may tacitly approve that the first notification message needs to be sent to the EAS.

S1130. The EAS receives the first notification message, and sends an ACT complete message to the EES based on the first notification message.

It should be noted that, the EAS receives the first notification message, and after determining that context information of an AC corresponding to the ACR is sent by a source EAS to a target EAS, the EAS sends an ACT complete message to the EES, where the ACT complete message may be included in an ACR status update notification and exist as a separate information element. Alternatively, the EES may receive the ACR status update notification, in other words, determines that ACT is completed.

Optionally, a timer may be set on an EAS side. If the EAS does not receive the first notification message after the timer expires, the EAS may send an ACT result and cause message to the EES. The message may alternatively be included in an ACR status update request. The message may indicate an ACT failure, and indicate that a reason for the ACT failure is that the timer expires but the terminal device does not move to the target location. It should be noted that the ACT failure does not necessarily mean that application context transmission fails, and may alternatively implicitly indicate that the terminal device does not move to the target location.

It should be noted that, after receiving the first notification message, the EAS may perform subsequent steps according to an existing procedure, for example, sending an ACR complete notification to an EEC.

In the method provided in this embodiment of this application, in comparison with another method in this specification, the EES does not sense a type of an event of the ACR, and the EES determines, based on only a subscription message of the EAS or the AC ID corresponding to the ACR and the target location corresponding to the ACR that are provided by the EAS, whether the terminal device moves to the target location. The EAS performs a subsequent communication procedure only after receiving the first notification message. This method has a minimum change to an existing protocol. This avoids signaling overheads caused when the EES keeps sending the location information of the terminal device to the EAS in an existing process. This can reduce the signaling overheads, and reduce modifications to the existing protocol.

Figure 12:
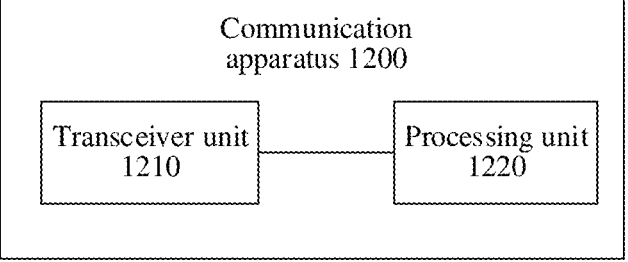
FIG. 12 is a schematic diagram of an example of an application context relocation communication apparatus according to an embodiment of this application.

FIG. 12 shows an example of an application context relocation apparatus provided in this application. As shown in FIG. 12, the apparatus 1200 includes a transceiver unit 1210 and a processing unit 1220.

In some embodiments, the application context relocation apparatus 1200 may be configured to implement a function of an EES (including a source EES and a target EES) involved in any one of the foregoing method embodiments. For example, the application context relocation apparatus 1200 may correspond to the EES.

The application context relocation apparatus may be the EES, and performs the steps performed by the EES in the foregoing method embodiments. The transceiver unit 1210 may be configured to support the context relocation apparatus 1200 in performing communication, for example, performing a sending and/or a receiving action performed by the EES in the foregoing method embodiments. The processing unit 1220 may be configured to support the application context transmission apparatus 1200 in performing a processing action in the foregoing method embodiments, for example, performing a processing action performed by the EES in the foregoing method embodiments.

Optionally, the application context relocation apparatus may further include a storage unit 1230 (not shown in FIG. 12), configured to store program code and data of the apparatus. For details, refer to the following descriptions.

The processing unit 1220 is configured to determine that a terminal device moves to a target location.

The transceiver unit 1210 is configured to: if the processing unit 1220 determines that the terminal device moves to the target location, send an ACR complete message to the terminal device.

The transceiver unit 1210 is further configured to: receive first indication information of the terminal device, where the first indication information indicates the edge enabler server to determine mobility of the terminal device: or receive second indication information of the terminal device, where the second indication information indicates that an edge enabler client of the terminal device does not support determining of the mobility of the terminal device.

The processing unit 1220 is further configured to detect an event of ACR, where a type of the event of the ACR is service continuity planning ACR.

The processing unit 1220 is further configured to determine, based on an application client ID corresponding to the ACR and/or the target location corresponding to the ACR, that the terminal device moves to the target location.

The transceiver unit 1210 is further configured to receive at least one of the following sent by an edge application server: a type of an event of ACR, an application client ID corresponding to the ACR, and the target location corresponding to the ACR.

The processing unit 1220 is further configured to determine, based on the application client ID corresponding to the ACR and/or the target location corresponding to the ACR, that the terminal device moves to the target location.

The transceiver unit 1210 is further configured to obtain a current location of the terminal device.

The processing unit 1220 is further configured to determine, based on the current location of the terminal device, the application client ID corresponding to the ACR, and the target location corresponding to the ACR, that the terminal device moves to the target location.

In some embodiments, the application context relocation apparatus 1200 may be configured to implement a function of an EEC in any one of the foregoing method embodiments. For example, the application context relocation apparatus 1200 may correspond to the EEC.

The application context relocation apparatus may be the EEC, and performs the steps performed by the EEC in the foregoing method embodiments. The transceiver unit 1210 may be configured to support the context relocation apparatus 1200 in performing communication, for example, performing a sending and/or a receiving action performed by the EEC in the foregoing method embodiments. The processing unit 1220 may be configured to support the application context transmission apparatus 1200 in performing a processing action in the foregoing method embodiments, for example, performing a processing action performed by the EEC in the foregoing method embodiments.

Optionally, the application context relocation apparatus may further include a storage unit 1230 (not shown in FIG. 12), configured to store program code and data of the apparatus. For details, refer to the following descriptions.

The transceiver unit 1210 is configured to receive an application context relocation ACR complete message.

The processing unit 1220 is configured to: if it is determined that a terminal device moves to a target location, switch an application client from a source edge application server to a target edge application server.

The processing unit 1220 is further configured to detect an event of ACR, where a type of the event of the ACR is service continuity planning ACR.

The processing unit 1220 is further configured to determine, based on an application client ID corresponding to the ACR and/or the target location corresponding to the ACR, that the terminal device moves to the target location.

The transceiver unit 1210 is further configured to receive at least one of the following: a type of an event of ACR and/or an application client ID corresponding to the ACR and/or the target location corresponding to the ACR.

The processing unit 1220 is further configured to determine, based on the application client ID corresponding to the ACR and/or the target location corresponding to the ACR, that the terminal device moves to the target location.

In some embodiments, the application context relocation apparatus 1200 may be configured to implement a function of an EAS (including a source EAS and a target EAS) involved in any one of the foregoing method embodiments. For example, the application context relocation apparatus 1200 may correspond to an EEC.

The application context relocation apparatus may be the EAS, and performs the steps performed by the EAS in the foregoing method embodiments. The transceiver unit 1210 may be configured to support the context relocation apparatus 1200 in performing communication, for example, performing a sending and/or a receiving action performed by the EAS in the foregoing method embodiments. The processing unit 1220 may be configured to support the application context transmission apparatus 1200 in performing a processing action in the foregoing method embodiment, for example, performing a processing action performed by the EAS in the foregoing method embodiments.

Optionally, the application context relocation apparatus may further include a storage unit 1230 (not shown in FIG. 12), configured to store program code and data of the apparatus.

For details, refer to the following descriptions.

The transceiver unit 1210 is configured to send, to an edge enabler server, an application client ID corresponding to ACR and/or a target location corresponding to the ACR.

The transceiver unit 1210 is further configured to receive a first notification message of the edge enabler server, where the first notification message indicates a terminal device to move to the target location.

The transceiver unit 1210 is further configured to send indication information to the edge enabler server based on the first notification message, where the indication information indicates that application context transmission ACT is completed.

The transceiver unit 1210 is further configured to send a subscription message to the edge enabler server, where the subscription message indicates the edge enabler server to send the first notification message to the edge application server when the terminal device moves to the target location.

The processing unit 1220 is configured to detect an event of the ACR, where a type of the event of the ACR is service continuity planning ACR.

Figure 13:
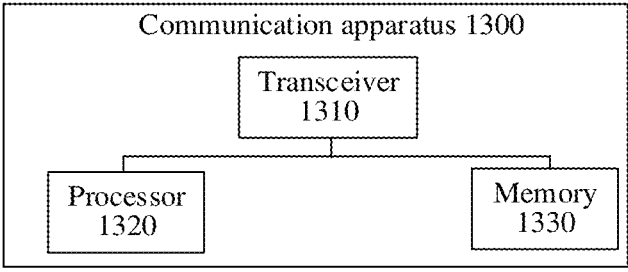
FIG. 13 is a schematic diagram of another example of an application context relocation communication apparatus according to an embodiment of this application.

FIG. 13 shows an example of a signal transmission apparatus 1300 according to an embodiment of this application. As shown in FIG. 13, the apparatus 1300 includes a transceiver 1310, a processor 1320, and a memory 1330. The memory 1330 is configured to store instructions. The processor 1320 is coupled to the memory 1330, and is configured to execute the instructions stored in the memory, to perform the method provided in the foregoing embodiments of this application.

The transceiver 1310 in the apparatus 1300 may correspond to the transceiver unit 1210 in the apparatus 1200, and the processor 1320 in the communication apparatus 1300 may correspond to the processing unit 1220 in the communication apparatus 1200.

It should be understood that the memory 1330 and the processor 1320 may be integrated into one processing apparatus. The processor 1320 is configured to execute program code stored in the memory 1330 to implement the foregoing functions. During specific implementation, the memory 1330 may alternatively be integrated into the processor 1320, or may be independent of the processor 1320.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that this implementation goes beyond the scope of this application.

It may be clearly understood by a person skilled in the art that, for a purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the foregoing described apparatus embodiment is merely an example. For example, division into the units is merely logical function division and there may be another division manner in actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in electronic, mechanical, or another form.

The units described as separate parts may or may not be physically separate, and parts displayed as units may or may not be physical units, in other words, may be located in one position, or may be distributed on a plurality of network units. Some or all of the units may be selected based on an actual requirement to achieve the objective of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in the storage medium, and includes several instructions for instructing a computer device (which may be a personal computer, a server, or a network device) to perform all or some of the steps in the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An application context relocation method, comprising:

in response to an edge enabler server determining that a terminal device moves to a target location and that application context transmission is completed, sending, by the edge enabler server, an application context relocation (ACR) complete message to the terminal device for a service continuity planning ACR; and obtaining, by the edge enabler server, a current location of the terminal device, wherein the determining that the terminal device moves to the target location comprises:

determining, based on the current location of the terminal device and an application client identifier (ID) corresponding to the ACR, that the terminal device moves to the target location; or determining, based on the current location of the terminal device, the application client ID corresponding to the ACR, and the target location corresponding to the ACR, that the terminal device moves to the target location.

2. The application context relocation method according to claim 1, wherein the target location is a service area of a target edge application server or an expected location of the terminal device.

3. The application context relocation method according to claim 1, further comprising:

receiving, by the edge enabler server, first indication information of the terminal device, wherein the first indication information indicates the edge enabler server to determine mobility of the terminal device.

4. The application context relocation method according to claim 1, further comprising:

detecting, by the edge enabler server, an event of the ACR, wherein a type of the event of the ACR is the service continuity planning ACR.

5. The application context relocation method according to claim 1, further comprising:

receiving, by the edge enabler server from an edge application server, one or more of a type of an event of the ACR, an application client ID corresponding to the ACR, or the target location corresponding to the ACR.

6. The application context relocation method according to claim 5, further comprising:

sending, by the edge application server to the edge enabler server, one or more of the type of the event of the ACR, the application client ID corresponding to the ACR, or the target location corresponding to the ACR.

7. The application context relocation method according to claim 1, further comprising:

receiving, by the terminal device, the ACR complete message; and switching, by the terminal device, an application client corresponding to the ACR from a source edge application server to a target edge application server.

8. An apparatus, comprising:

at least one processor; and at least one memory coupled to the at least one processor and storing programming instructions that, when executed by the at least one processor, cause the apparatus to:

in response to determining that a terminal device moves to a target location and that application context transmission is completed, send an application context relocation (ACR) complete message to the terminal device for a service continuity planning ACR; and obtain a current location of the terminal device, wherein the determining that the terminal device moves to the target location comprises:

determining, based on the current location of the terminal device and an application client identifier (ID) corresponding to the ACR, that the terminal device moves to the target location; or determining, based on the current location of the terminal device, the application client ID corresponding to the ACR, and the target location corresponding to the ACR, that the terminal device moves to the target location.

9. The apparatus according to claim 8, wherein the target location is a service area of a target edge application server or an expected location of the terminal device.

10. The apparatus according to claim 9, wherein the apparatus is further caused to:

receive first indication information of the terminal device, wherein the first indication information indicates the apparatus to determine mobility of the terminal device.

11. The apparatus according to claim 9, wherein the apparatus is further caused to:

detect an event of the ACR, wherein a type of the event of the ACR is the service continuity planning ACR.

12. The apparatus according to claim 9, wherein the apparatus is further caused to:

receive, from an edge application server, one or more of a type of an event of the ACR, an application client ID corresponding to the ACR, or the target location corresponding to the ACR.

13. A system comprising:

an edge enabler server; and a terminal device, wherein the edge enabler server is configured to:

in response to determining that the terminal device moves to a target location and that application context transmission is completed, send an application context relocation (ACR) complete message to the terminal device for a service continuity planning ACR; and obtain a current location of the terminal device, wherein the determining that the terminal device moves to the target location comprises:

determining, based on the current location of the terminal device and an application client identifier (ID) corresponding to the ACR, that the terminal device moves to the target location; or determining, based on the current location of the terminal device, the application client ID corresponding to the ACR, and the target location corresponding to the ACR, that the terminal device moves to the target location, and the terminal device is configured to receive the ACR complete message.

14. The system according to claim 13, wherein the target location is a service area of a target edge application server or an expected location of the terminal device.

15. The system according to claim 13, wherein the edge enabler server is further configured to:

receive first indication information of the terminal device, wherein the first indication information indicates the edge enabler server to determine mobility of the terminal device.

16. The system according to claim 13, wherein the edge enabler server is further configured to:

detect an event of the ACR, wherein a type of the event of the ACR is the service continuity planning ACR.

17. The system according to claim 13, wherein the edge enabler server is further configured to:

receive, from an edge application server, one or more of a type of an event of the ACR, an application client ID corresponding to the ACR, or the target location corresponding to the ACR.

18. The system according to claim 17, wherein the system further comprises the edge application server, and the edge application server is configured to send, to the edge enabler server, one or more of the type of the event of the ACR, the application client ID corresponding to the ACR, or the target location corresponding to the ACR.

* * * * *